United States Patent
Zhang et al.

(10) Patent No.: US 12,207,308 B2
(45) Date of Patent: Jan. 21, 2025

(54) RANDOM ACCESS METHOD AND APPARATUS

(71) Applicant: HUAWEI TECHNOLOGIES CO., LTD., Shenzhen (CN)

(72) Inventors: Yunhao Zhang, Shanghai (CN); Xiaomeng Chai, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 17/677,085

(22) Filed: Feb. 22, 2022

(65) Prior Publication Data
US 2022/0183074 A1 Jun. 9, 2022

Related U.S. Application Data

(63) Continuation of application No. PCT/CN2019/107316, filed on Sep. 23, 2019.

(51) Int. Cl.
*H04W 74/0833* (2024.01)

(52) U.S. Cl.
CPC .............. *H04W 74/0833* (2013.01)

(58) Field of Classification Search
None
See application file for complete search history.

(56) References Cited

U.S. PATENT DOCUMENTS

2012/0314652 A1* 12/2012 Ahn ............... H04W 56/0045
370/328
2014/0219204 A1* 8/2014 Park ................ H04W 74/002
370/329
2024/0057106 A1* 2/2024 Hong ............... H04B 7/0626

FOREIGN PATENT DOCUMENTS

| CN | 106793148 A | 5/2017 | |
|----|----|----|----|
| CN | 107872884 A | 4/2018 | |
| CN | 108702751 A | 10/2018 | |
| CN | 109152082 A | 1/2019 | |
| CN | 105142118 B | 2/2019 | |
| CN | 109309964 A | 2/2019 | |
| CN | 109547947 A | 3/2019 | |
| CN | 109639719 B * | 1/2020 | ......... H04L 63/0407 |
| WO | 2016/021638 A1 | 2/2016 | |
| WO | 2017146777 A1 | 8/2017 | |
| WO | 2018/228170 A1 | 12/2018 | |
| WO | 2019/019822 A1 | 1/2019 | |

OTHER PUBLICATIONS

Huawei, Hisilicon, Rel-17 work scope on NR sidelink enhancements for 5G V2X and other use case, 3GPP TSG RAN Meeting #84, Newport Beach, USA, Jun. 3-6, 2019, RP-191011, 12 pages.

(Continued)

*Primary Examiner* — Kenny S Lin
*Assistant Examiner* — Rodrick Mak
(74) *Attorney, Agent, or Firm* — Maier & Maier, PLLC

(57) ABSTRACT

A random access method and an apparatus. In the method, random access is completed in a manner in which an agent terminal performs access, so that an access requirement of a terminal can be satisfied under low energy consumption. The method and the apparatus may be applied to application scenarios such as an internet of things (IoT), machine type communication (MTC), massive machine type communication (mMTC), an internet of vehicles, and a connected vehicle.

18 Claims, 9 Drawing Sheets

(56) References Cited

OTHER PUBLICATIONS

3GPP TS 38.300 V15.6.0 (Jun. 2019), 3rd Generation Partnership Project; Technical Specification Group Radio Access Network; NR; NR and NG-RAN Overall Description; Stage 2 (Release 15), 99 pages.

Huawei et al., "Overview of Rel-17 work areas for NR and LTE", 3GPP TSG RAN Meeting #84, RP-191486, Newport Beach, USA, Jun. 3-6, 2019, 22 pages.

* cited by examiner

RANDOM ACCESS METHOD AND APPARATUS

CROSS-REFERENCE TO RELATED APPLICATIONS

This application is a continuation of International Application No. PCT/CN2019/107316, filed on Sep. 23, 2019, the disclosure of which is hereby incorporated by reference in its entirety.

FIELD

The embodiments relate to the communication field, and in particular, to a random access method and an apparatus in the communication field.

BACKGROUND

In a wireless communication network, a terminal may initiate a random access process when accessing a network. However, when a terminal that is sensitive to energy consumption initiates random access, energy consumption of the terminal that is sensitive to energy consumption is impacted, and communication performance of the terminal that is sensitive to energy consumption is further affected. Therefore, how to satisfy an access requirement of the terminal that is sensitive to energy consumption under low energy consumption becomes a problem that needs to be urgently resolved.

SUMMARY

Embodiments provide a random access method and an apparatus.

According to a first aspect, an embodiment provides a communication method. The method may be performed by a first terminal or may be performed by a component (for example, a processor, a chip, or a chip system) of the first terminal. The method includes: receiving preamble identifier information and random access identifier information from a second terminal and receiving first random access response information from a network device based on the preamble identifier information and the random access identifier information.

According to the foregoing method, the first terminal receives random access response information based on the preamble identifier information and the random access identifier information that are from the second terminal. The first terminal may not need to send a random access request to the network device. Therefore, a random access requirement of the first terminal can be satisfied while energy consumption of the first terminal is reduced.

Optionally, the first random access response information includes first temporary identifier information and first timing advance information. In this way, the first terminal can obtain a temporary identifier related to the random access and a timing advance used for communication, so that the first terminal completes random access and can communicate with the network device.

Optionally, the preamble identifier information indicates a preamble identifier, and the random access identifier information indicates a random access identifier. The random access identifier may be, for example, a random access radio network temporary identifier (RA-RNTI). In this way, the first terminal can correctly identify a random access response from the network device.

Optionally, the first terminal sends first feedback information to the network device, where the first feedback information indicates that the network device is successfully accessed. Based on the first feedback information, the network device can learn that the first terminal has successfully accessed the network device, so that subsequently the network device can further allocate a resource to the first terminal and communicate with the first terminal.

Optionally, the preamble identifier information and the random access identifier information are carried on a sidelink channel. The sidelink channel may be, for example, a physical sidelink control channel (PSCCH), a physical sidelink shared channel (PSSCH), or a physical sidelink discovery channel (PSDCH). When the first terminal and the second terminal are close, the sidelink channel between the first terminal and the second terminal generally has good quality. Therefore, transmitting the preamble identifier information and the random access identifier information through the sidelink channel can improve information receiving accuracy, so that the first terminal can correctly identify the random access response.

Optionally, the preamble identifier information and the random access identifier information are carried on one of the following bandwidth parts (BWPs): a sidelink BWP (SL BWP), a default BWP, which is sometimes referred to as a fallback BWP, an initial BWP, or an uplink BWP (UL BWP).

When the first terminal and the second terminal are close, the sidelink BWP or the uplink BWP between the first terminal and the second terminal generally has good quality. Therefore, transmitting the preamble identifier information and the random access identifier information through the sidelink BWP or the uplink BWP can improve the information receiving accuracy, so that the first terminal can correctly identify the random access response.

When an activated BWP expires or is unavailable, the default BWP or the initial BWP may provide a backup transmission path for the preamble identifier information and the random access identifier information, to improve a probability that the first terminal obtains the preamble identifier information and the random access identifier information, so that the first terminal can correctly identify the random access response.

Optionally, the first terminal and the second terminal belong to a same terminal group. The terminal group may be obtained through terminal group building, where the second terminal may be understood as an agent terminal in the terminal group. Random access is completed in a manner in which the agent terminal in the terminal group assists in performing access, so that the access requirement of the first terminal can be satisfied under low energy consumption.

Optionally, the first terminal is a terminal that is sensitive to energy consumption, and the second terminal is a terminal that is insensitive to energy consumption. Random access is completed in a manner in which the terminal that is insensitive to energy consumption assists the terminal that is sensitive to energy consumption in performing access, so that an access requirement of the terminal that is sensitive to energy consumption can be satisfied under low energy consumption.

With reference to the first aspect, in some implementations of the first aspect, the first temporary identifier information indicates a first temporary identifier. The first terminal receives first contention resolution information from the network device based on the first temporary identifier, where the first contention resolution information indicates a second temporary identifier.

In the foregoing implementation, the first terminal may not need to send the random access request to the network device. Therefore, the random access requirement of the first terminal can be satisfied while the energy consumption is reduced.

Optionally, the first contention resolution information is carried on a physical downlink shared channel (physical downlink shared channel, PDSCH). Because a reception status may be fed back for the PDSCH, a success rate of receiving the first contention resolution information by the first terminal can be improved.

Optionally, the first terminal communicates with the network device based on the second temporary identifier or the first timing advance information. In this way, the first terminal can perform data transmission with the network device.

Optionally, the first temporary identifier is a first temporary cell radio network temporary identifier (TC-RNTI), the first timing advance information indicates a first timing advance, and the second temporary identifier is a first cell radio network temporary identifier (C-RNTI). In this way, the first terminal can obtain a TC-RNTI related to the random access and a timing advance and a C-RNTI used for communication, so that the first terminal completes random access and can communicate with the network device.

With reference to the first aspect, in some implementations of the first aspect, the first temporary identifier information indicates a second temporary identifier. In this implementation, the first terminal may not need to send the random access request to the network device. Therefore, the random access requirement of the first terminal can be satisfied while the energy consumption is reduced, and an access process is simplified, to reduce an access delay and signaling overheads.

Optionally, the first terminal communicates with the network device based on the second temporary identifier or the first timing advance information. In this way, the first terminal can perform data transmission with the network device.

Optionally, the second temporary identifier is a second C-RNTI, and the first timing advance information indicates a second timing advance. In this way, the first terminal can obtain a timing advance and a C-RNTI used for communication, so that the first terminal completes random access and can communicate with the network device.

According to a second aspect, an embodiment provides a communication method. The method may be performed by a second terminal or may be performed by a component (for example, a processor, a chip, or a chip system) of the second terminal. The method includes: sending preamble identifier information to a first terminal and sending random access identifier information to the first terminal.

According to the foregoing method, the second terminal sends information related to random access to the first terminal. After obtaining the information, the first terminal may perform random access without sending a random access request to a network device. Therefore, a random access requirement of the first terminal can be satisfied while energy consumption is reduced.

Optionally, the preamble identifier information indicates a preamble identifier, and the random access identifier information indicates a random access identifier. The random access identifier may be, for example, an RA-RNTI. In this way, the first terminal can correctly identify related information in a random access process.

Optionally, the preamble identifier information and the random access identifier information are carried on a sidelink channel. The sidelink channel may be, for example, a PSCCH, a PSSCH, or a PSDCH.

Optionally, the preamble identifier information and the random access identifier information are carried on one of the following BWPs: a sidelink BWP (SL BWP), a default BWP, which is sometimes referred to as a fallback BWP, an initial BWP, or an uplink BWP (UL BWP).

Optionally, the first terminal and the second terminal belong to a same terminal group.

Optionally, the first terminal is a terminal that is sensitive to energy consumption, and the second terminal is a terminal that is insensitive to energy consumption.

With reference to the second aspect, in some implementations of the second aspect, the second terminal sends a preamble to the network device, where the preamble may be carried on a physical random access channel (PRACH). Optionally, the second terminal receives first random access response information from the network device and sends first terminal identifier information to the network device, where the first terminal identifier information indicates an identifier of the first terminal. The first terminal identifier information may be carried on a physical uplink shared channel (PUSCH).

In the foregoing implementation, the second terminal serving as an agent terminal of the first terminal initiates an access request to the network device, and the first terminal may not need to send a random access request to the network device. Therefore, the random access requirement of the first terminal can be satisfied while the energy consumption is reduced.

With reference to the second aspect, in some implementations of the second aspect, the second terminal sends a preamble and first terminal identifier information to the network device, where the first terminal identifier information indicates an identifier of the first terminal. Optionally, the preamble may be carried on a physical random access channel PRACH, and the first terminal identifier information may be carried on a PUSCH.

In the foregoing implementation, the second terminal serving as an agent terminal of the first terminal initiates an access request to the network device. Therefore, the random access requirement of the first terminal can be satisfied while the energy consumption is reduced, and the access process is simplified, to reduce an access delay and signaling overheads.

According to a third aspect, an embodiment provides a communication method. The method may be performed by a network device or may be performed by a component (for example, a processor, a chip, or a chip system) of the network device. The method includes: sending first random access response information to a first terminal or sending first random access response information to a first terminal and a second terminal.

Optionally, the first terminal and the second terminal belong to a same terminal group.

Optionally, the first terminal is a terminal that is sensitive to energy consumption, and the second terminal is a terminal that is insensitive to energy consumption.

Optionally, the first random access response information includes first temporary identifier information and first timing advance information.

Optionally, the first random access response information is carried in a message 2 (Msg2) or a message B (MsgB).

Optionally, the first random access response information is sent in one of the following manners: a broadcast manner, a multicast manner, or a unicast manner.

Optionally, the network device receives first feedback information from the first terminal, where the first feedback information indicates that the network device is successfully accessed. Based on the first feedback information, the network device can learn that the first terminal has successfully accessed the network device, so that subsequently the network device can further allocate a resource to the first terminal and communicate with the first terminal.

According to the foregoing method, the first terminal may obtain the first random access response information from the network device without sending a random access request to the network device. Therefore, a random access requirement of the first terminal can be satisfied while energy consumption is reduced.

With reference to the third aspect, in some implementations of the third aspect, the network device receives a preamble from the second terminal, where the preamble may be carried on a PRACH. After sending the first random access response information, the network device receives first terminal identifier information from the second terminal, where the first terminal identifier information indicates an identifier of the first terminal. The first terminal identifier information may be carried on a PUSCH. The first temporary identifier information indicates a first temporary identifier. The network device sends first contention resolution information to the first terminal based on the first terminal identifier information, where the first contention resolution information indicates a second temporary identifier.

Optionally, the first contention resolution information is carried on a PDSCH.

Optionally, the first temporary identifier is a first TC-RNTI, the first timing advance information indicates a first timing advance, and the second temporary identifier is a first C-RNTI.

In the foregoing implementation, the network device processes an access request initiated by the second terminal serving as an agent terminal of the first terminal to the network device, and the first terminal may not need to send the random access request to the network device. Therefore, the random access requirement of the first terminal can be satisfied while the energy consumption is reduced.

With reference to the third aspect, in some implementations of the third aspect, before sending the first random access response information, the network device receives a preamble and first terminal identifier information from the second terminal, where the first terminal identifier information indicates an identifier of the first terminal. The preamble may be carried on a PRACH, and the first terminal identifier information may be carried on a PUSCH.

In the foregoing implementation, the network device processes an access request initiated by the second terminal serving as an agent terminal of the first terminal to the network device, and the first terminal may not need to send the random access request to the network device. Therefore, the random access requirement of the first terminal can be satisfied while the energy consumption is reduced, and an access process is simplified, to reduce an access delay and signaling overheads.

According to a fourth aspect, an embodiment provides a communication method. The method may be performed by a first terminal or may be performed by a component (for example, a processor, a chip, or a chip system) of the first terminal. The method includes: receiving second temporary identifier information from a second terminal and receiving second random access response information or second contention resolution information from a network device based on the second temporary identifier information.

According to the foregoing method, the first terminal receives random access response information or contention resolution information based on related information from the second terminal. The first terminal may not need to send a random access request to the network device. Therefore, a random access requirement of the first terminal can be satisfied while energy consumption is reduced.

Optionally, the second temporary identifier information is carried on a sidelink channel. The sidelink channel may be, for example, a PSCCH, a PSSCH, or a PSDCH. When the first terminal and the second terminal are close, the sidelink channel between the first terminal and the second terminal generally has good quality. Therefore, transmitting the second temporary identifier information through the sidelink channel can improve information receiving accuracy, so that the first terminal can correctly identify a random access response or the contention resolution information.

Optionally, the second temporary identifier information is carried on one of the following BWPs: a sidelink BWP (SL BWP), a default BWP, which is sometimes referred to as a fallback BWP, an initial BWP, or an uplink BWP (UL BWP).

When the first terminal and the second terminal are close, the sidelink BWP or the uplink BWP between the first terminal and the second terminal generally has good quality. Therefore, transmitting the second temporary identifier information through the sidelink BWP or the uplink BWP can improve the information receiving accuracy, so that the first terminal can correctly identify the random access response or the contention resolution information.

When an activated BWP expires or is unavailable, the default BWP or the initial BWP may provide a backup transmission path for the second temporary identifier information, to improve a probability that the first terminal obtains the second temporary identifier information, so that the first terminal can correctly identify the random access response or the contention resolution information.

Optionally, the first terminal sends second feedback information to the network device, where the second feedback information indicates that the network device is successfully accessed. Based on the second feedback information, the network device can learn that the first terminal has successfully accessed the network device, so that subsequently the network device can further allocate a resource to the first terminal and communicate with the first terminal.

Optionally, the first terminal and the second terminal belong to a same terminal group. The terminal group may be obtained through terminal group building, where the second terminal may be understood as an agent terminal in the terminal group. Random access is completed in a manner in which the agent terminal in the terminal group assists in performing access, so that the access requirement of the first terminal can be satisfied under low energy consumption.

Optionally, the first terminal is a terminal that is sensitive to energy consumption, and the second terminal is a terminal that is insensitive to energy consumption. Random access is completed in a manner in which the terminal that is insensitive to energy consumption assists the terminal that is sensitive to energy consumption in performing access, so that an access requirement of the terminal that is sensitive to energy consumption can be satisfied under low energy consumption.

With reference to the fourth aspect, in some implementations of the fourth aspect, the second temporary identifier information indicates a third temporary identifier. The first terminal receives the second contention resolution information from the network device based on the third temporary identifier, where the second contention resolution information indicates a fourth temporary identifier.

In the foregoing implementation, the first terminal may not need to send the random access request to the network device. Therefore, the random access requirement of the first terminal can be satisfied while the energy consumption is reduced.

Optionally, the first terminal receives second timing advance information from the second terminal, where the second timing advance information indicates a second timing advance. The second timing advance information may be carried on the sidelink channel, and the sidelink channel may be, for example, a PSCCH, a PSSCH, or a PSDCH. The second timing advance information may be carried on the SL BWP, the default BWP, the initial BWP, or the UL BWP. The third temporary identifier is a second TC-RNTI, the second contention resolution information is carried on a PDSCH, and the fourth temporary identifier is a third C-RNTI. Further, optionally, the first terminal communicates with the network device based on the fourth temporary identifier or the second timing advance information. In this way, the first terminal can obtain a TC-RNTI related to the random access and a timing advance and a C-RNTI used for communication, so that the first terminal completes random access and can communicate with the network device.

With reference to the fourth aspect, in some implementations of the fourth aspect, the second temporary identifier information indicates a fifth temporary identifier. The first terminal receives the second random access response information from the network device based on the fifth temporary identifier, where the second random access response information indicates a fourth temporary identifier.

In the foregoing implementation, the first terminal may not need to send the random access request to the network device. Therefore, the random access requirement of the first terminal can be satisfied while the energy consumption is reduced.

Optionally, the first terminal receives second timing advance information from the second terminal, where the second timing advance information indicates a second timing advance. The second timing advance information may be carried on the sidelink channel, and the sidelink channel may be, for example, a PSCCH, a PSSCH, or a PSDCH. The second timing advance information may be carried on the SL BWP, the default BWP, the initial BWP, or the UL BWP. The fifth temporary identifier is a sidelink RNTI (SL-RNTI), the second random access response information is carried on a PDSCH, and the fourth temporary identifier is a third C-RNTI. Further, optionally, the first terminal communicates with the network device based on the fourth temporary identifier or the second timing advance information. In this way, the first terminal can obtain the SL-RNTI related to a sidelink and a timing advance and a C-RNTI used for communication, so that the first terminal can communicate with the network device.

Optionally, the first terminal sends first terminal identifier information to the second terminal, where the first terminal identifier information indicates an identifier of the first terminal. In this way, the second terminal can learn of the identifier of the first terminal, or the second terminal can learn that the first terminal has an access requirement, so that the first terminal can perform random access by using the second terminal.

According to a fifth aspect, an embodiment provides a communication method. The method may be performed by a second terminal or may be performed by a component (for example, a processor, a chip, or a chip system) of the second terminal. The method includes: sending second temporary identifier information to a first terminal. Optionally, the second temporary identifier information is carried on a sidelink channel, and the sidelink channel may be, for example, a PSCCH, a PSSCH, or a PSDCH. Optionally, the second temporary identifier information is carried on one of the following BWPs: a sidelink BWP (SL BWP), a default BWP, which is sometimes referred to as a fallback BWP, an initial BWP, or an uplink BWP (UL BWP). Optionally, the first terminal and the second terminal belong to a same terminal group. Optionally, the first terminal is a terminal that is sensitive to energy consumption, and the second terminal is a terminal that is insensitive to energy consumption.

According to the foregoing method, the second terminal sends information related to random access to the first terminal. After obtaining the information, the first terminal may perform random access without sending a random access request to a network device. Therefore, a random access requirement of the first terminal can be satisfied while energy consumption is reduced.

With reference to the fifth aspect, in some implementations of the fifth aspect, the second temporary identifier information indicates a third temporary identifier.

Optionally, the third temporary identifier is a second TC-RNTI.

Optionally, the second terminal sends a preamble to the network device and receives third random access response information from the network device, where the third random access response information indicates a second timing advance. The preamble may be carried on a PRACH.

Optionally, the second terminal sends second timing advance information to the first terminal, where the second timing advance information indicates the second timing advance. The second terminal may send the second timing advance information to the first terminal through the sidelink channel. The second timing advance information may be carried on the SL BWP, the default BWP, the initial BWP, or the UL BWP.

Optionally, the second terminal sends first terminal identifier information to the network device, where the first terminal identifier information indicates an identifier of the first terminal. The first terminal identifier information may be carried on a PUSCH.

In the foregoing implementation, the second terminal serving as an agent terminal of the first terminal initiates an access request to the network device. Therefore, the random access requirement of the first terminal can be satisfied while the energy consumption is reduced.

With reference to the fifth aspect, in some implementations of the fifth aspect, the second temporary identifier information indicates a fifth temporary identifier.

Optionally, the fifth temporary identifier is a sidelink RNTI (SL-RNTI).

Optionally, the second terminal is in a radio resource control (RRC) connected state.

Optionally, the second terminal sends second timing advance information to the first terminal, where the second timing advance information indicates a second timing advance. The second terminal may send the second timing advance information to the first terminal through the sidelink channel. The second timing advance information may be carried on the SL BWP, the default BWP, the initial BWP, or the UL BWP.

Optionally, the second terminal receives first terminal identifier information from the first terminal, where the first terminal identifier information indicates an identifier of the first terminal.

Optionally, the second terminal sends the first terminal identifier information to the network device or sends the first terminal identifier information and the second temporary identifier information to the network device, where the first terminal identifier information indicates the identifier of the first terminal.

In the foregoing implementation, the first terminal may not need to send the random access request to the network device. Therefore, the random access requirement of the first terminal can be satisfied while the energy consumption is reduced.

According to a sixth aspect, an embodiment provides a communication method. The method may be performed by a network device or may be performed by a component (for example, a processor, a chip, or a chip system) of the network device. The method includes: sending second random access response information or second contention resolution information to a first terminal.

Optionally, the second random access response information is carried in a Msg2 or a MsgB, and the second contention resolution information is carried on a PDSCH.

Optionally, the second random access response information or the second contention resolution information is sent in one of the following manners: a broadcast manner, a multicast manner, or a unicast manner.

Optionally, the network device receives second feedback information from the first terminal, where the second feedback information indicates that the network device is successfully accessed. Based on the second feedback information, the network device can learn that the first terminal has successfully accessed the network device, so that subsequently the network device can further allocate a resource to the first terminal and communicate with the first terminal.

According to the foregoing method, the first terminal may obtain the second random access response information or the second contention resolution information from the network device without sending a random access request to the network device. Therefore, a random access requirement of the first terminal can be satisfied while energy consumption is reduced.

With reference to the sixth aspect, in some implementations of the sixth aspect, the network device sends the second contention resolution information to the first terminal, where the second contention resolution information indicates a fourth temporary identifier.

Optionally, the fourth temporary identifier is a third C-RNTI.

Optionally, the network device receives a preamble from a second terminal and sends third random access response information to the second terminal, where the third random access response information indicates a second timing advance. The preamble may be carried on a PRACH.

Optionally, the network device receives first terminal identifier information from the second terminal, where the first terminal identifier information indicates an identifier of the first terminal.

Optionally, the first terminal is a terminal that is sensitive to energy consumption, and the second terminal is a terminal that is insensitive to energy consumption.

In the foregoing implementation, the network device processes an access request initiated by the second terminal serving as an agent terminal of the first terminal to the network device, and the first terminal may not need to send the random access request to the network device. Therefore, the random access requirement of the first terminal can be satisfied while the energy consumption is reduced.

With reference to the sixth aspect, in some implementations of the sixth aspect, the network device sends the second random access response information to the first terminal, where the second random access response information indicates a fourth temporary identifier.

Optionally, the fourth temporary identifier is a third C-RNTI.

Optionally, the network device receives first terminal identifier information from the second terminal or receives first terminal identifier information and second temporary identifier information from the second terminal. The first terminal identifier information indicates an identifier of the first terminal, and the second temporary identifier information indicates a fifth temporary identifier. Further, optionally, the fifth temporary identifier is a sidelink RNTI (SL-RNTI).

Optionally, the first terminal is a terminal that is sensitive to energy consumption, and the second terminal is a terminal that is insensitive to energy consumption.

In the foregoing implementation, the network device processes an access request initiated by the second terminal serving as an agent terminal of the first terminal to the network device, and the first terminal may not need to send the random access request to the network device. Therefore, the random access requirement of the first terminal can be satisfied while the energy consumption is reduced.

According to a seventh aspect, an embodiment provides an apparatus, to implement the method according to any one of the first aspect, the fourth aspect, the possible implementations of the first aspect, or the possible implementations of the fourth aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to an eighth aspect, an embodiment provides an apparatus, to implement the method according to any one of the second aspect, the fifth aspect, the possible implementations of the second aspect, or the possible implementations of the fifth aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a ninth aspect, an embodiment provides an apparatus, to implement the method according to any one of the third aspect, the sixth aspect, the possible implementations of the third aspect, or the possible implementations of the sixth aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a tenth aspect, an embodiment provides an apparatus. The apparatus includes a processor, where the processor is coupled to a memory, and the memory is configured to store a program or instructions. When the program or the instructions are executed by the processor, the apparatus is enabled to implement the method according to the first aspect, the fourth aspect, the possible implementations of the first aspect, or the possible implementations of the fourth aspect.

According to an eleventh aspect, an embodiment provides an apparatus. The apparatus includes a processor, where the processor is coupled to a memory, and the memory is configured to store a program or instructions. When the program or the instructions are executed by the processor, the apparatus is enabled to implement the method according to the second aspect, the fifth aspect, the possible implementations of the second aspect, or the possible implementations of the fifth aspect.

According to a twelfth aspect, an embodiment provides an apparatus. The apparatus includes a processor, where the processor is coupled to a memory, and the memory is configured to store a program or instructions. When the program or the instructions are executed by the processor, the apparatus is enabled to implement the method according to the third aspect, the sixth aspect, the possible implementations of the third aspect, or the possible implementations of the sixth aspect.

According to a thirteenth aspect, an embodiment provides a storage medium, where the storage medium stores a computer program or instructions. When the computer program or the instructions are executed, a computer is enabled to perform the method according to any one of the first aspect, the fourth aspect, the possible implementations of the first aspect, or the possible implementations of the fourth aspect.

According to a fourteenth aspect, an embodiment provides a storage medium, where the storage medium stores a computer program or instructions. When the computer program or the instructions are executed, a computer is enabled to perform the method according to any one of the second aspect, the fifth aspect, the possible implementations of the second aspect, or the possible implementations of the fifth aspect.

According to a fifteenth aspect, an embodiment provides a storage medium, where the storage medium stores a computer program or instructions. When the computer program or the instructions are executed, a computer is enabled to perform the method according to any one of the third aspect, the sixth aspect, the possible implementations of the third aspect, or the possible implementations of the sixth aspect.

According to a sixteenth aspect, an embodiment provides a computer program product. The computer program product includes computer program code. When the computer program code is run on a computer, the computer is enabled to perform the method according to any one of the first aspect, the fourth aspect, the possible implementations of the first aspect, or the possible implementations of the fourth aspect.

According to a seventeenth aspect, an embodiment provides a computer program product. The computer program product includes computer program code. When the computer program code is run on a computer, the computer is enabled to perform the method according to any one of the second aspect, the fifth aspect, the possible implementations of the second aspect, or the possible implementations of the fifth aspect.

According to an eighteenth aspect, an embodiment provides a computer program product. The computer program product includes computer program code. When the computer program code is run on a computer, the computer is enabled to perform the method according to any one of the third aspect, the sixth aspect, the possible implementations of the third aspect, or the possible implementations of the sixth aspect.

According to a nineteenth aspect, an embodiment provides a chip. The chip includes a processor, where the processor is coupled to a memory, and the memory is configured to store a program or instructions. When the program or the instructions are executed by the processor, the chip is enabled to implement the method according to the first aspect, the fourth aspect, the possible implementations of the first aspect, or the possible implementations of the fourth aspect.

According to a twentieth aspect, an embodiment provides a chip. The chip includes a processor, where the processor is coupled to a memory, and the memory is configured to store a program or instructions. When the program or the instructions are executed by the processor, the chip is enabled to implement the method according to the second aspect, the fifth aspect, the possible implementations of the second aspect, or the possible implementations of the fifth aspect.

According to a twenty-first aspect, an embodiment provides a chip. The chip includes a processor, where the processor is coupled to a memory, and the memory is configured to store a program or instructions. When the program or the instructions are executed by the processor, the chip is enabled to implement the method according to the third aspect, the sixth aspect, the possible implementations of the third aspect, or the possible implementations of the sixth aspect.

According to a twenty-second aspect, an embodiment provides a communication system. The communication system includes the apparatus according to the seventh aspect, the apparatus according to the eighth aspect, and the apparatus according to the ninth aspect.

According to a twenty-third aspect, an embodiment provides a communication system. The communication system includes the apparatus according to the tenth aspect, the apparatus according to the eleventh aspect, and the apparatus according to the twelfth aspect.

DETAILED DESCRIPTION OF THE EMBODIMENTS

Figure 1:
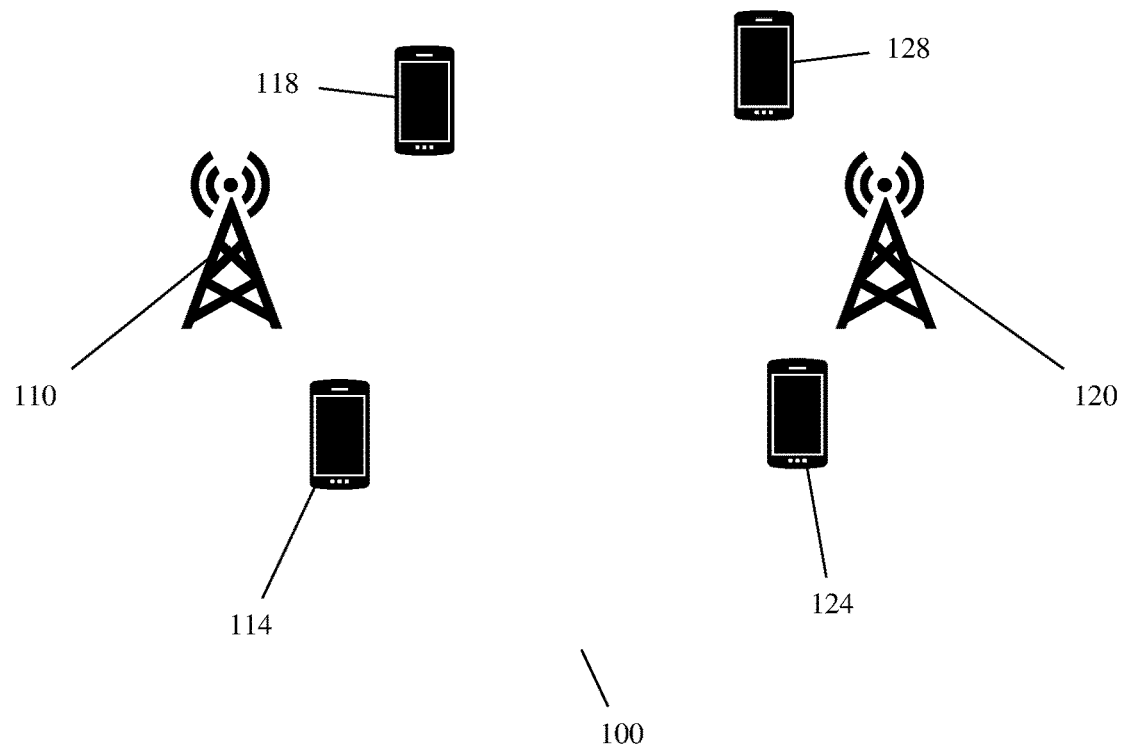
FIG. 1 is a schematic diagram of a communication system to which an embodiment is applied.

A method and an apparatus provided in embodiments may be applied to a communication system. FIG. 1 is a schematic diagram of a structure of a communication system. The communication system 100 includes one or more network devices (a network device 110 and a network device 120 are shown in the figure), and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network devices 110/120 and the terminals 114/118/124/128 may also be referred to as communication devices.

The technologies described in the embodiments may be applied to various communication systems, for example, a 4th generation (4G) communication system, a 4.5G communication system, a 5G communication system, a system in which a plurality of communication systems is integrated, or a future evolved communication system. The communication systems include, for example, a long term evolution (LTE) system, a new radio (NR) system, a wireless fidelity (Wi-Fi) system, a communication system related to the 3rd generation partnership project (3GPP), and another communication system of this type.

Figure 2:
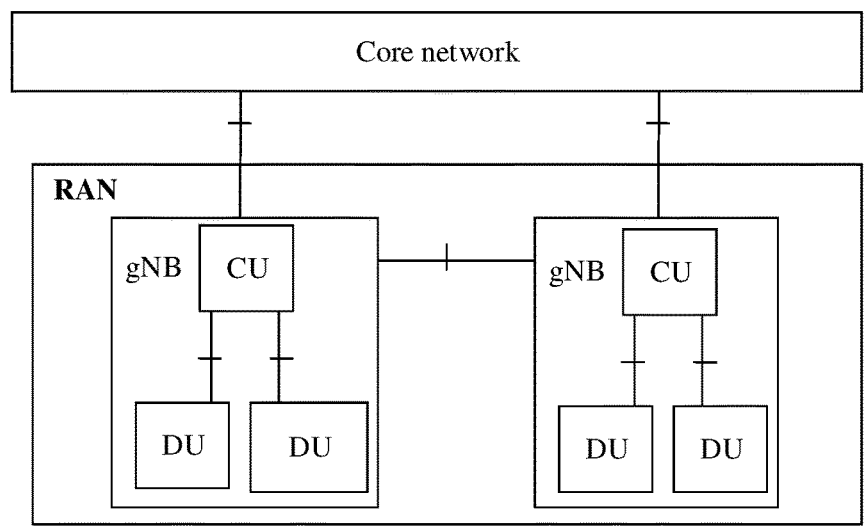
FIG. 2 is a schematic diagram of an example of an architecture of a communication system.

FIG. 2 is a schematic diagram of an example of a possible architecture of a communication system. As shown in FIG. 2, a network device in a radio access network (RAN) is a base station (such as a gNB) with an architecture in which a centralized unit (CU) and a distributed unit (DU) are separated. The RAN may be connected to a core network (for example, an LTE core network or a 5G core network). The CU and the DU may be understood as division of a base station from a perspective of logical functions. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are deployed on the CU, and functions of a radio link control (RLC) layer, a media access control (MAC) layer, and a physical layer are deployed on the DU. It may be understood that division into processing functions of the CU and the DU based on the protocol layers is merely an example, and the processing functions of the CU and the DU may alternatively be divided in another manner. For example, the CU or the DU may have functions of more protocol layers through division. For example, the CU or the DU may alternatively have some processing functions of protocol layers through division. In an implementation, some functions of the RLC layer and functions of a protocol layer above the RLC layer are deployed on the CU, and remaining functions of the RLC layer and functions of a protocol layer below the RLC layer are deployed on the DU. In another implementation, functions of the CU or the DU may alternatively be divided based on a service type or another system requirement. For example, division is performed based on a latency, functions whose processing time needs to satisfy a latency requirement are deployed on the DU, and functions whose processing time does not need to satisfy the latency requirement are deployed on the CU. A network architecture shown in FIG. 2 may be applied to a 5G communication system and may alternatively share one or more components or resources with an LTE system. In another implementation, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

The function of the CU may be implemented by one entity or may be used to further separate a control plane (CP) and a user plane (UP). The control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided are also applicable to an architecture in which the CU and the DU are not separated.

The network device may be any device having a wireless transceiver function. The network device includes but is not limited to: an evolved NodeB (eNB) in LTE, a base station (gNB) or a transmission reception point (TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks using a same technology or may support the aforementioned networks using different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a machine communication device, a vehicle-mounted device, or the like. An example in which the network device is a base station is used for description below. The plurality of network devices may be base stations of a same type or base stations of different types. The base station may communicate with a terminal device or may communicate with a terminal device via a relay station. The terminal device may communicate with a plurality of base stations using different technologies. For example, the terminal device may communicate with a base station supporting an LTE network, may communicate with a base station supporting a 5G network, or may support a dual connection to the base station supporting the LTE network and the base station supporting the 5G network.

The terminal is a device having a wireless transceiver function. The terminal may be deployed on land, including an indoor or outdoor terminal, a hand-held terminal, a wearable terminal, or a vehicle-mounted terminal; may be deployed on a water surface (for example, on a ship); or may be deployed in the air (for example, on an airplane, a balloon, or a satellite). The terminal may be a mobile phone, a tablet (Pad), a computer having a wireless transceiver function, a virtual reality (VR) terminal device, an augmented reality (AR) terminal device, a terminal in industrial control, a vehicle-mounted terminal device, a terminal in self-driving, a terminal in assisted driving, a terminal in telemedicine (remote medical), a terminal in a smart grid, a terminal in transportation safety, a terminal in a smart city, a terminal in a smart home, or the like. Application scenarios are not limited in the embodiments. Sometimes, the terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like. The terminal may be fixed or mobile.

By way of example and not limitation, the terminal may alternatively be a wearable device. The wearable device may also be referred to as a wearable intelligent device and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal may alternatively be a terminal in an internet of things (IoT) system. An IoT system is an important part of future development of information technologies. A main feature of the IoT system is connecting a thing to a network by using a communication technology, to implement an intelligent network for interconnection between a person and a machine or between one thing and another. The terminal may alternatively be a terminal in machine type communication (MTC). The terminal may alternatively be a vehicle-mounted module, a vehicle-mounted component, a vehicle-mounted chip, or a vehicle-mounted unit with which a vehicle is equipped as one or more components or units. By using the vehicle-mounted module, the vehicle-mounted module, the vehicle-mounted component, the vehicle-mounted chip, or the vehicle-mounted unit with which the vehicle is equipped, the vehicle may implement the method. Therefore, the embodiments may be applied to an internet of vehicles, for example, vehicle-to-everything (V2X), long term evolution-vehicle (LTE-V), and vehicle-to-vehicle (V2V).

In a wireless communication network, a terminal may initiate a random access process when accessing a network. However, when a terminal that is sensitive to energy consumption initiates random access, energy consumption of the terminal that is sensitive to energy consumption is impacted, and communication performance of the terminal that is sensitive to energy consumption is further affected. For example, when a terminal that is sensitive to energy consumption and that is far from a network device initiates a random access process, the terminal sends a preamble to the network device at high power. Consequently, energy consumption of the terminal that is sensitive to energy consumption is accelerated. Therefore, how to satisfy an access requirement of the terminal that is sensitive to energy consumption under low energy consumption becomes a problem that needs to be urgently resolved.

In a method, random access is completed in a manner in which an agent terminal in a terminal group assists in performing access, so that the access requirement of the terminal that is sensitive to energy consumption can be satisfied under low energy consumption. Random access is completed through terminal group building (which is also referred to as terminal clustering, terminal team building, or the like), so that a contention or collision probability in the access process can be effectively reduced and an access success rate can be improved. It may be understood that "random access" and "access" are sometimes used interchangeably.

A physical resource may include one or more of a time domain resource, a frequency domain resource, a code domain resource, or a space domain resource. For example, the time domain resource included in the physical resource may include at least one frame, at least one subframe, at least one slot, at least one mini-slot, at least one time unit, at least one time domain symbol, or the like. For example, the frequency domain resource included in the physical resource may include at least one carrier, at least one component carrier (CC), at least one bandwidth part (BWP), at least one resource block group (RBG), at least one physical resource block group (PRG), at least one resource block (RB), or at least one subcarrier (SC). For example, the space domain resource included in the physical resource may include at least one beam, at least one port, at least one antenna port, at least one layer/space layer, or the like. For example, the code domain resource included in the physical resource may include at least one orthogonal cover code (OCC), at least one non-orthogonal multiple access (NOMA) code, or the like.

It may be understood that the physical resource may be a physical resource of a baseband, and the physical resource of the baseband may be used by a baseband chip. Alternatively, the physical resource may be a physical resource of an air interface. Alternatively, the physical resource may be a physical resource of an intermediate frequency or a radio frequency.

The following describes the solutions in detail by using embodiments with reference to the accompanying drawings. The following embodiments and implementations may be combined with each other, and same or similar concepts or processes may not be described repeatedly in some embodiments. It should be understood that a function explained may be implemented by using an independent hardware circuit, software running in combination with a processor/microprocessor or a general-purpose computer, an application-specific integrated circuit, and/or one or more digital signal processors. The method may alternatively be implemented in a computer processor and a memory coupled to the processor.

For ease of understanding of the embodiments, some concepts or terms are first briefly described.

Downlink (DL): The downlink is a link from a network device to a terminal.

Uplink (UL): The uplink is a link from a terminal to a network device.

Sidelink (SL): The sidelink is a link from one terminal to one or more other terminals, and may also be referred to as a sidelink, or a device-to-device (D2D) link.

Bandwidth part (BWP): The bandwidth part is a group of continuous or discrete RBs on a carrier and may be understood as a group of continuous or discrete frequency domain resources in frequency domain. When the BWP is activated, the BWP may carry uplink information, downlink information, or sidelink information.

Terminal group building: The terminal group building may also be referred to as terminal clustering, terminal team building, or the like. Two or more terminals form a terminal group (which may also be referred to as a terminal cluster, a terminal cooperating group, or the like). The terminal group includes one cooperating terminal (which may also be referred to as a cluster head terminal, a cluster agent terminal, cooperating user equipment (CUE), or the like) and one or more target terminals (which may also be referred to as cluster member terminals, common cluster terminals, or target user equipments (TUEs)).

CUE: The CUE is UE that directly communicates with a network device and that is in a terminal group and can assist TUE in the terminal group in communicating with the network device.

TUE: The TUE is UE that communicates with a network device through CUE and that is in a terminal group.

Figure 3:
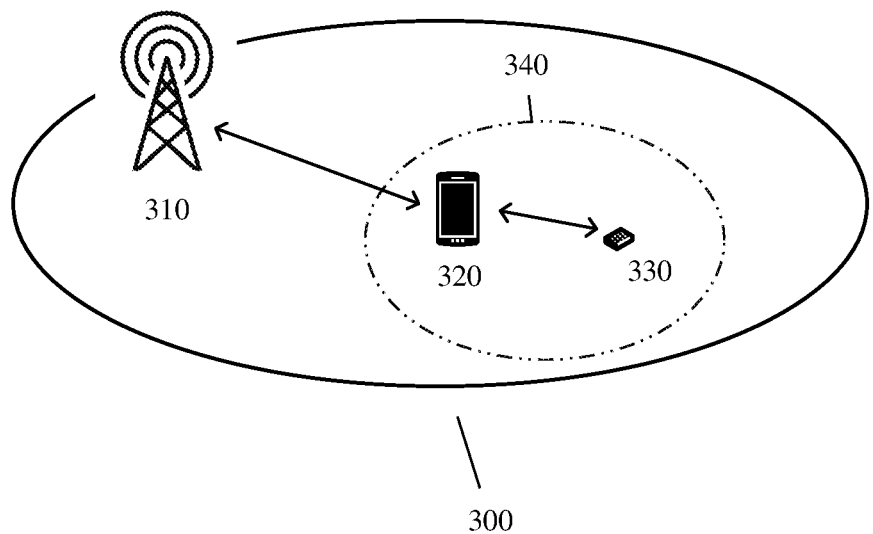
FIG. 3 is a schematic diagram of a communication scenario to which an embodiment is applicable.

FIG. 3 is used as an example to further describe a terminal group, CUE, and TUE. FIG. 3 is a schematic diagram of a communication scenario 300. The communication scenario 300 shown in FIG. 3 includes a network device 310, a terminal 320, and a terminal 330. The terminal 320 and the terminal 330 form a terminal group 340, the terminal 320 is the CUE in the terminal group 340, and the terminal 330 is the TUE in the terminal group 340. The terminal 320 CUE can directly communicate with the network device 310, and the terminal 330 TUE communicates with the network device 310 through the terminal 320. It may be understood that in FIG. 3, there may be one terminal group that includes one TUE. A quantity of terminal groups and a quantity of TUEs in the terminal group are not limited.

A scenario in which communication is performed through terminal group building and that is shown in FIG. 3 may adapt to some communication requirements. For example, when the terminal 330 TUE is a terminal that is sensitive to energy consumption, and the terminal 320 CUE is a terminal that is insensitive to energy consumption, the terminal 320 CUE and the terminal 330 TUE may form the terminal group 340, and the terminal 330 TUE communicates with the network device 310 through the terminal 320 CUE. Because the terminal 320 CUE and the terminal 330 TUE in the terminal group 340 are generally close, power consumption of the terminal 330 TUE is low when the terminal 330 TUE communicates with the terminal 320 CUE, so that a service life of the terminal 330 TUE that is sensitive to energy consumption can be extended.

Figure 4A:
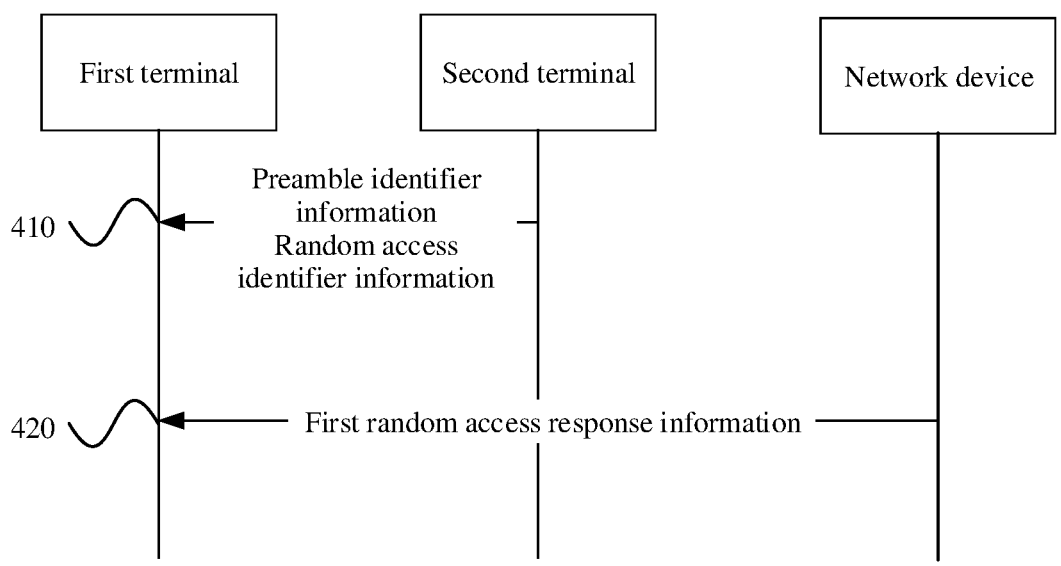
FIG. 4A to FIG. 4C are schematic interaction diagrams of several communication methods according to embodiments.

FIG. 4A is a schematic interaction diagram of a communication method 400 according to an embodiment. In FIG. 4A, an example in which schematic interaction is executed by a first terminal, a second terminal, and a network device is used to illustrate the communication method. However, an execution body of the schematic interaction is not limited. For example, the network device in FIG. 4A may alternatively be a chip, a chip system, a processor, or the like that supports the network device in implementing the method. For example, the first terminal in FIG. 4A may alternatively be a chip, a chip system, a processor, or the like that supports the first terminal in implementing the method. For example, the second terminal in FIG. 4A may alternatively be a chip, a chip system, a processor, or the like that supports the second terminal in implementing the method. As shown in FIG. 4A, the method 400 in this embodiment may include a part 410 and a part 420.

Part 410: The second terminal sends preamble identifier information and random access identifier information. The first terminal receives the preamble identifier information and the random access identifier information. Optionally, the first terminal and the second terminal belong to a same terminal group. Further, optionally, the first terminal is TUE, and the second terminal is CUE. For descriptions of the terminal group, the TUE, and the CUE, refer to descriptions of the terminal group, the TUE, and the CUE in FIG. 3.

Part 420: The network device sends first random access response information. The first terminal receives the first random access response information based on the preamble identifier information and the random access identifier information. The first random access response information may be carried in a message 2 (Msg2) or a message B (MsgB).

The network device may send the first random access response information to the first terminal in a broadcast or multicast manner or may send the first random access response information to the first terminal in a unicast manner.

It may be understood that, in the part 410, the preamble identifier information and the random access identifier information may be carried in one piece of signaling or may be respectively carried in two pieces of signaling.

The signaling is either or both of the following two types of signaling:
higher layer signaling (for example, RRC signaling, an RRC message, or a MAC control element (MAC CE)) and
control information that is carried on a physical channel.

Optionally, in the part 410, the preamble identifier information and the random access identifier information are carried on a sidelink channel. The sidelink channel may be a physical sidelink control channel (PSCCH), a physical sidelink shared channel (PSSCH), or a physical sidelink discovery channel (PSDCH). The second terminal sends the preamble identifier information and the random access identifier information to the first terminal through the sidelink channel. It may be understood that the second terminal may send the preamble identifier information and the random access identifier information to the first terminal through the sidelink channel in the broadcast or multicast manner. Alternatively, the second terminal may send the preamble identifier information and the random access identifier information to the first terminal through the sidelink channel in the unicast manner.

Optionally, in the part 410, the preamble identifier information and the random access identifier information are carried on a sidelink bandwidth part BWP (SL BWP), a default BWP, which is sometimes referred to as a fallback BWP, an initial BWP, or an uplink BWP (UL BWP).

The following briefly describes several types of BWPs in the embodiments.

Sidelink BWP: The sidelink BWP is a BWP used to carry sidelink information.

Default BWP: The default BWP is a BWP used to carry uplink information, downlink information, or sidelink information when an activated BWP expires or is unavailable.

Initial BWP: The initial BWP is a BWP used to carry information related to random access and/or information related to paging.

Uplink BWP: The uplink BWP is a BWP used to carry uplink information and/or sidelink information.

Optionally, before the part 410, the first terminal sends first terminal identifier information to the second terminal, and the second terminal receives the first terminal identifier information, where the first terminal identifier information indicates an identifier of the first terminal.

In a possible implementation of the method 400, the preamble identifier information indicates a preamble identifier, and the random access identifier information indicates a random access identifier (for example, a random access radio network temporary identifier (RA-RNTI)). The first terminal obtains the first random access response information based on the preamble identifier and the random access identifier.

For example, the first random access response information is carried on a physical downlink shared channel (PDSCH), and control information used to control the first terminal to receive the PDSCH is carried on a physical downlink control channel (PDCCH). The first terminal descrambles the PDCCH by using the random access identifier, receives, based on the control information (for example, either or both of resource allocation information and modulation and coding information) carried on the PDCCH, the PDSCH carrying the first random access response information, obtains, from the PDSCH, a MAC protocol data unit (PDU) corresponding to the preamble identifier, and obtains the first random access response information from the MAC PDU.

Optionally, the first terminal is a terminal that is sensitive to energy consumption, and the second terminal is a terminal that is insensitive to energy consumption.

According to the foregoing method, the first terminal receives random access response information based on related information from the second terminal. When the first terminal is the terminal that is sensitive to energy consumption, according to the foregoing method, the terminal that is sensitive to energy consumption may not need to send a random access request to the network device. Therefore, a random access requirement of the terminal that is sensitive to energy consumption can be satisfied while energy consumption is reduced.

Figure 4B:
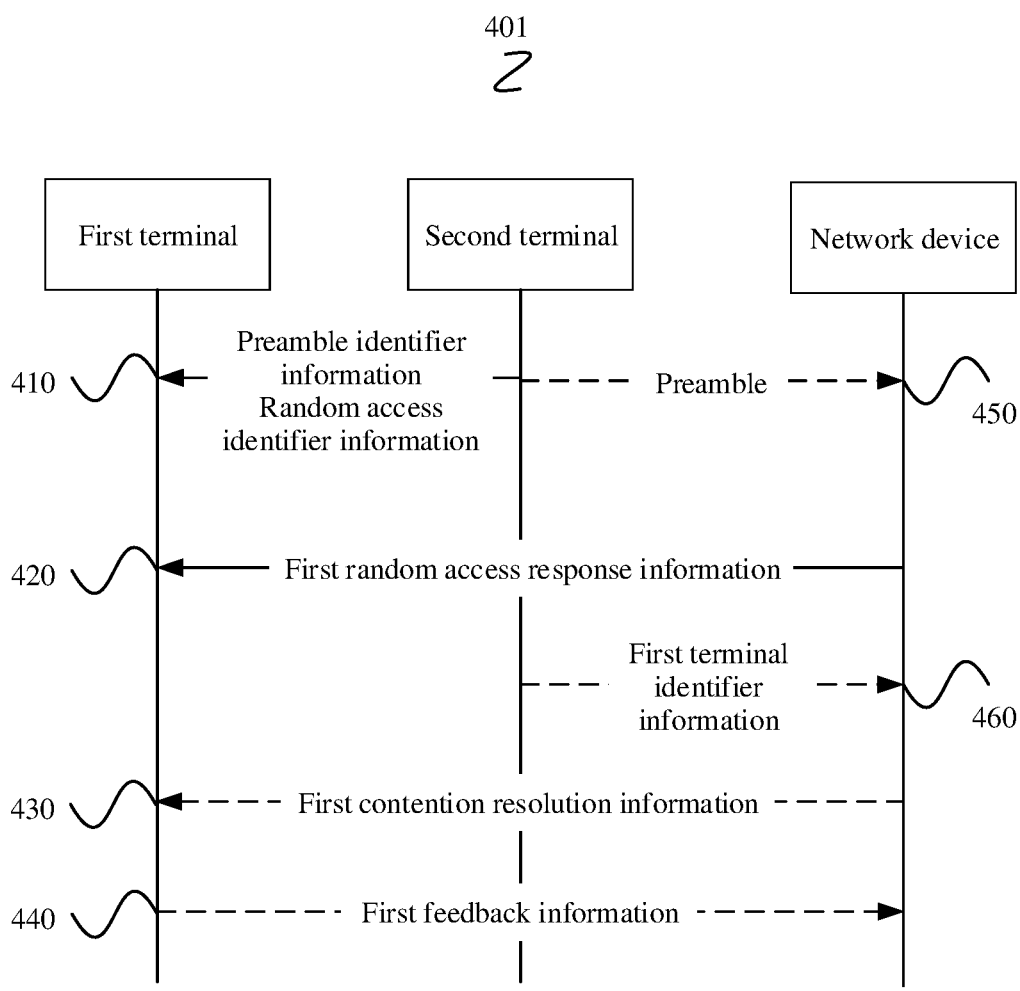

FIG. 4B is a schematic interaction diagram of a communication method 401 according to an embodiment. The method 401 may be understood as a possible implementation of the method 400. In FIG. 4B, an example in which schematic interaction is executed by a first terminal, a second terminal, and a network device is used to illustrate the communication method. However, an execution body of the schematic interaction is not limited i. For example, the network device in FIG. 4B may alternatively be a chip, a chip system, a processor, or the like that supports the network device in implementing the method. For example, the first terminal in FIG. 4B may alternatively be a chip, a chip system, a processor, or the like that supports the first terminal in implementing the method. For example, the second terminal in FIG. 4B may alternatively be a chip, a chip system, a processor, or the like that supports the second terminal in implementing the method.

As shown in FIG. 4B, the method 401 may include the part 410 and the part 420 in the method 400. For the part 410 and the part 420, refer to descriptions in the method 400. Further, the first random access response information in the part 420 includes first temporary identifier information and first timing advance information, where the first temporary identifier information indicates a first temporary identifier. The method 401 may further include an optional part 430. Part 430: The first terminal receives first contention resolution information from the network device based on the first temporary identifier, where the first contention resolution information indicates a second temporary identifier. The first contention resolution information may be carried on a PDSCH. Optionally, the first terminal communicates with the network device based on the second temporary identifier or the first timing advance information.

For example, the first temporary identifier is a first temporary cell radio network temporary identifier (TC-RNTI), and the first timing advance information indicates a first timing advance. The first contention resolution information is carried on the PDSCH, and control information used to control the first terminal to receive the PDSCH is carried on a PDCCH. The first terminal descrambles the PDCCH by using the first TC-RNTI, and receives, based on the control information (for example, either or both of resource allocation information and modulation and coding information) carried on the PDCCH, the PDSCH carrying the first contention resolution information. The second temporary identifier indicated by the first contention resolution information is a first cell radio network temporary identifier (C-RNTI).

The first terminal may communicate with the network device based on the first C-RNTI or the first timing advance. For example, the first terminal may descramble the PDCCH from the network device by using the first C-RNTI. For another example, the first terminal may determine, by using the first timing advance, a time point at which uplink data is sent to the network device.

The method 401 may further include an optional part 440. Part 440: The first terminal sends first feedback information to the network device, where the first feedback information indicates that the network device is successfully accessed. Based on the first feedback information, the network device can learn that the first terminal has successfully accessed the network device, so that subsequently the network device can further allocate a resource to the first terminal and communicate with the first terminal.

The method 401 may further include an optional part 450. Part 450: The second terminal sends a preamble to the network device, and the network device receives the preamble. Optionally, the preamble is carried on a physical random access channel (PRACH). Sending the preamble to the network device through the PRACH may also be understood as initiating random access. Optionally, the preamble identifier information in the part 410 indicates the preamble. An execution sequence of the part 410 and the part 450 is not limited in this embodiment. The part 410 may be executed first and then the part 450 may be executed, the part 450 may be executed first and then the part 410 may be executed, or the part 410 and the part 450 may be simultaneously executed. It may be understood that the preamble may also be referred to as a preamble sequence, an access preamble, a random preamble, a random access preamble, or the like.

For example, the second terminal may select a to-be-sent preamble (which is identified as a preamble 1) from candidate preambles, determine a PRACH resource for sending the preamble 1, and send the preamble 1 to the network device by using the PRACH resource.

It may be understood that the second terminal may determine the foregoing random access identifier (for example, an RA-RNTI) based on the determined PRACH resource for sending the preamble 1.

For example, if a subframe and a frequency domain resource of the PRACH for sending the preamble 1 are respectively identified by t1_subframe and f1, the random access identifier (for example, the RA-RNTI) may satisfy RA-RNTI=1+t1_subframe+10×f1.

For another example, if a time domain symbol, a slot, a frequency domain resource, and an uplink carrier of the PRACH for sending the preamble 1 are respectively identified by t1_symbol, t1_slot, f1, and ulcarrier1, the random access identifier (for example, the RA-RNTI) may satisfy RA-RNTI=1+t1_symbol+14×t1_slot+14×80×f1+14×80×8× ulcarrier1.

After the network device receives the preamble, the part 420 may be performed. For example, after receiving the preamble, the network device may obtain the random access identifier (for example, the RA-RNTI), scramble control information (which may also be understood as a control channel carrying the control information) of the first random access response information by using the random access identifier, and send the control information of the first random access response information and the first random access response information to the first terminal.

Optionally, in the part 420, the second terminal may also receive the first random access response information from the network device. The method 401 further includes a part 460. Part 460: The second terminal sends first terminal identifier information to the network device, and the network device receives the first terminal identifier information, where the first terminal identifier information indicates an identifier of the first terminal. Optionally, the first terminal identifier information is carried on a physical uplink shared channel (PUSCH). After receiving the first terminal identifier information in the part 460 and learning that the first terminal requests access, the network device may include the identifier of the first terminal in the first contention resolution information in the part 430. When the first terminal receives the first contention resolution information and determines that the first contention resolution information includes the identifier of the first terminal, the first terminal may obtain the second temporary identifier (for example, the foregoing first C-RNTI) from the first contention resolution information, where the second temporary identifier corresponds to the identifier of the first terminal.

The foregoing method may be understood as that the second terminal serving as an agent terminal of the first terminal initiates an access request to the network device. When the first terminal is a terminal that is sensitive to energy consumption, according to the foregoing method, the terminal that is sensitive to energy consumption may not need to send a random access request to the network device and may not need to consume energy. Therefore, a random access requirement of the terminal that is sensitive to energy consumption can be satisfied while energy consumption is reduced.

Figure 4C:
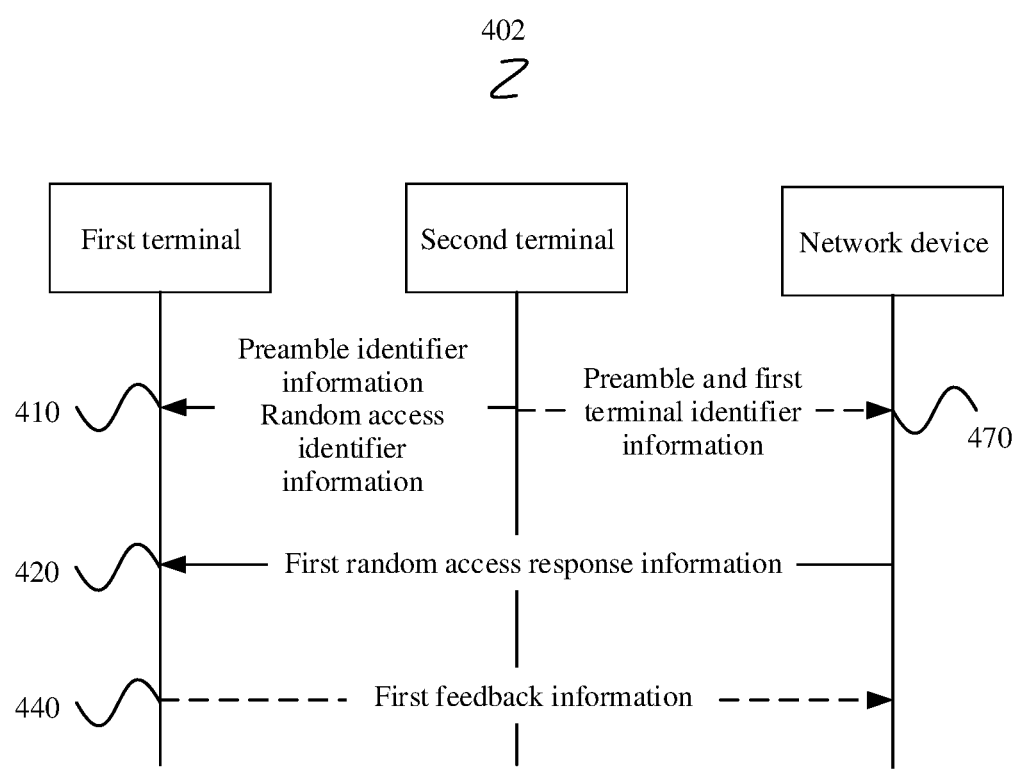

FIG. 4C is a schematic interaction diagram of a communication method 402 according to an embodiment. The method 402 may be understood as another possible implementation of the method 400. In FIG. 4C, an example in which schematic interaction is executed by a first terminal, a second terminal, and a network device is used to illustrate the communication method. However, an execution body of the schematic interaction is not limited. For example, the network device in FIG. 4C may alternatively be a chip, a chip system, a processor, or the like that supports the network device in implementing the method. For example, the first terminal in FIG. 4C may alternatively be a chip, a chip system, a processor, or the like that supports the first terminal in implementing the method. For example, the second terminal in FIG. 4C may alternatively be a chip, a chip system, a processor, or the like that supports the second terminal in implementing the method.

As shown in FIG. 4C, the method 402 may include the part 410 and the part 420 in the method 400. For the part 410 and the part 420, refer to descriptions in the method 400. Further, the first random access response information in the part 420 includes first temporary identifier information and first timing advance information, where the first temporary identifier information indicates a second temporary identifier. Optionally, the first terminal communicates with the network device based on the second temporary identifier or the first timing advance information.

For example, the second temporary identifier is a second C-RNTI, and the first timing advance information indicates a second timing advance. The first terminal may communicate with the network device based on the second C-RNTI or the second timing advance. For example, the first terminal may descramble a PDCCH from the network device by using the second C-RNTI. For another example, the first terminal may determine, by using the second timing advance, a time point at which uplink data is sent to the network device.

The method 402 may further include an optional part 440. For the part 440, refer to descriptions in the method 401. Details are not described herein again.

The method 402 may further include an optional part 470. Part 470: The second terminal sends a preamble and first terminal identifier information to the network device, and the network device receives the preamble and first terminal identifier information, where the first terminal identifier information indicates an identifier of the first terminal. Optionally, the preamble is carried on a PRACH, and the first terminal identifier information is carried on a PUSCH. Optionally, the preamble identifier information in the part 410 indicates the preamble. An execution sequence of the part 410 and the part 470 is not limited in this embodiment. The part 410 may be executed first and then the part 470 may be executed, the part 470 may be executed first and then the part 410 may be executed, or the part 410 and the part 470 may be simultaneously executed.

For example, the second terminal may select a to-be-sent preamble (which is identified as a preamble 2) from candidate preambles, determine a PRACH resource for sending the preamble 2, and send the preamble 2 to the network device by using the PRACH resource. It may be understood that the second terminal may determine the foregoing random access identifier (for example, an RA-RNTI) based on the determined PRACH resource for sending the preamble 2. For a manner of determining the random access identifier, refer to descriptions in the method 401. Details are not described herein again.

After the network device receives the preamble and the first terminal identifier information, the part 420 may be performed. For example, after receiving the preamble and the first terminal identifier information, the network device may obtain the random access identifier (for example, the RA-RNTI) and the identifier of the first terminal, scramble control information (which may also be understood as a control channel carrying the control information) of the first random access response information by using the random access identifier, and send the control information of the first random access response information and the first random access response information to the first terminal.

The method 402 may be understood as that the second terminal serving as an agent terminal of the first terminal initiates an access request to the network device. When the first terminal is a terminal that is sensitive to energy consumption, according to the foregoing implementation method, the terminal that is sensitive to energy consumption may not need to send a random access request to the network device. Therefore, a random access requirement of the terminal that is sensitive to energy consumption can be satisfied while energy consumption is reduced. In addition, compared with the method 401, the method 402 simplifies an access process, to reduce an access delay and signaling overheads.

Figure 5A:
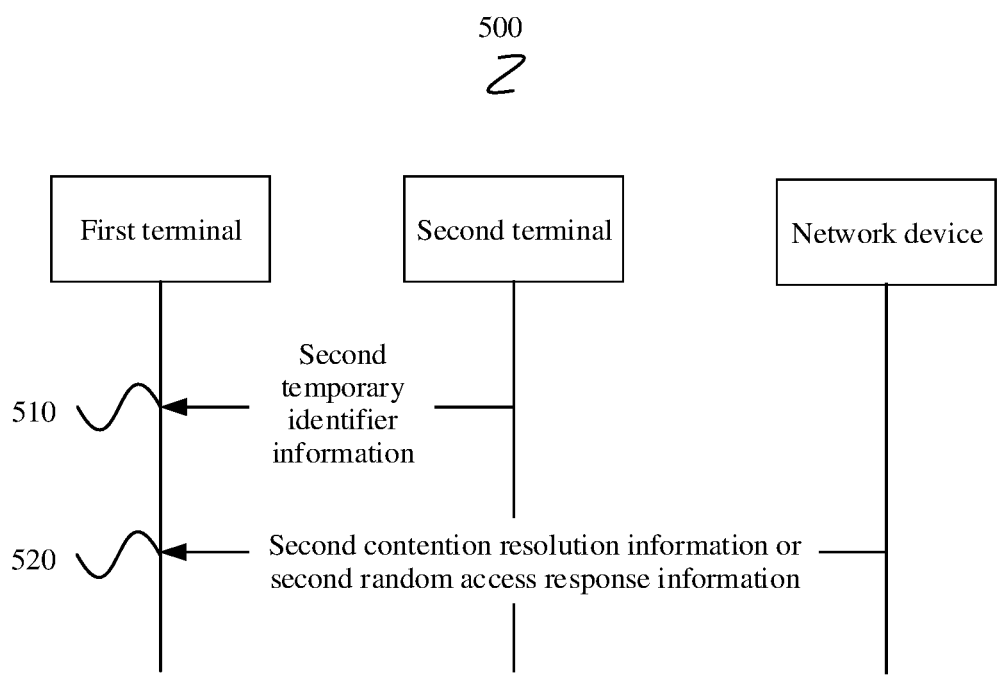
FIG. 5A to FIG. 5C are schematic interaction diagrams of several other communication methods according to embodiments.

FIG. 5A is a schematic interaction diagram of a communication method 500 according to an embodiment. In FIG. 5A, an example in which schematic interaction is executed by a first terminal, a second terminal, and a network device is used to illustrate the communication method. However, an execution body of the schematic interaction is not limited. For example, the network device in FIG. 5A may alternatively be a chip, a chip system, a processor, or the like that supports the network device in implementing the method. For example, the first terminal in FIG. 5A may alternatively be a chip, a chip system, a processor, or the like that supports the first terminal in implementing the method. For example, the second terminal in FIG. 5A may alternatively be a chip, a chip system, a processor, or the like that supports the second terminal in implementing the method. As shown in FIG. 5A, the method 500 in this embodiment may include a part 510 and a part 520.

Part 510: The second terminal sends second temporary identifier information. The first terminal receives the second temporary identifier information. Optionally, the first terminal and the second terminal belong to a same terminal group. Further, optionally, the first terminal is TUE, and the second terminal is CUE. For descriptions of the terminal group, the TUE, and the CUE, refer to descriptions of the terminal group, the TUE, and the CUE in FIG. 3.

Part 520: The network device sends second random access response information or second contention resolution information. The first terminal receives the second random access response information, or the second contention resolution information based on the second temporary identifier information. The second random access response information may be carried in a Msg2 or a MsgB, and the second contention resolution information may be carried on a PDSCH. The network device may send the second random access response information or the second contention resolution information to the first terminal in a broadcast or multicast manner or may send the second random access response information or the second contention resolution information to the first terminal in a unicast manner.

Optionally, in the part 510, the second temporary identifier information is carried on a sidelink channel. The sidelink channel may be a PSCCH, a PSSCH, or a PSDCH. The second terminal sends the second temporary identifier information to the first terminal through the sidelink channel. It may be understood that the second terminal may send the second temporary identifier information to the first terminal through the sidelink channel in the broadcast or multicast manner or may send the second temporary identifier information to the first terminal through the sidelink channel in the unicast manner.

Optionally, in the part 510, the second temporary identifier information is carried on an SL BWP, a default BWP, an initial BWP, or a UL BWP.

Optionally, before the part 510, the first terminal sends first terminal identifier information to the second terminal, and the second terminal receives the first terminal identifier information, where the first terminal identifier information indicates an identifier of the first terminal.

Optionally, the first terminal is a terminal that is sensitive to energy consumption, and the second terminal is a terminal that is insensitive to energy consumption. According to the foregoing method, the first terminal receives random access response information based on related information from the second terminal. When the first terminal is the terminal that is sensitive to energy consumption, according to the foregoing method, the terminal that is sensitive to energy consumption may not need to send a random access request to the network device. Therefore, a random access requirement of the terminal that is sensitive to energy consumption can be satisfied while energy consumption is reduced.

Figure 5B:
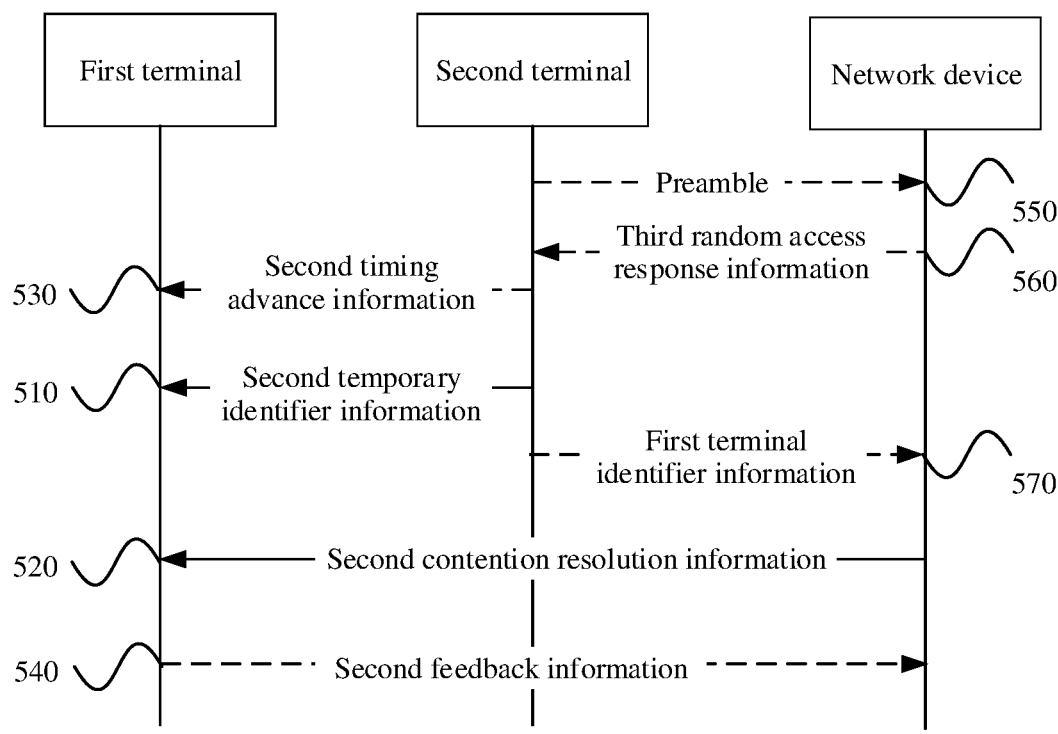

In a possible implementation method 501 of the method 500, with reference to FIG. 5B, the second temporary identifier information in the part 510 indicates a third temporary identifier, in the part 520, the network device sends second contention resolution information, and the first terminal obtains the second contention resolution information based on the third temporary identifier, where the second contention resolution information indicates a fourth temporary identifier. The method 501 further includes an optional part 530. Part 530: The first terminal receives second timing advance information from the second terminal. Further, optionally, the first terminal communicates with the network device based on the fourth temporary identifier or the second timing advance information.

It may be understood that an execution sequence of the part 510 and the part 530 is not limited in this embodiment. The part 510 may be executed first and then the part 530 may be executed, the part 530 may be executed first and then the part 510 may be executed, or the part 510 and the part 530 may be simultaneously executed.

In the part 530, optionally, the second timing advance information is carried on a sidelink channel. The sidelink channel may be a PSCCH, a PSSCH, or a PSDCH. The second terminal sends the second timing advance information to the first terminal through the sidelink channel. It may be understood that the second terminal may send the second timing advance information to the first terminal through the sidelink channel in a broadcast or multicast manner or may send the second timing advance information to the first terminal through the sidelink channel in a unicast manner.

In the part 530, optionally, the second timing advance information is carried on an SL BWP, a default BWP, an initial BWP, or a UL BWP.

For example, the second timing advance information indicates a second timing advance, the third temporary identifier is a second TC-RNTI, the second contention resolution information is carried on a PDSCH, and control information used to control the first terminal to receive the PDSCH is carried on a PDCCH. The first terminal descrambles the PDCCH by using the second TC-RNTI, and receives, based on the control information (for example, either or both of resource allocation information and modulation and coding information) carried on the PDCCH, the PDSCH carrying the second contention resolution information. The fourth temporary identifier indicated by the second contention resolution information is a third C-RNTI.

The first terminal may communicate with the network device based on the third C-RNTI or the second timing advance. For example, the first terminal may descramble the PDCCH from the network device by using the third C-RNTI. For another example, the first terminal may determine, by using the second timing advance, a time point at which uplink data is sent to the network device.

The method 501 may further include an optional part 540. Part 540: The first terminal sends second feedback information to the network device, where the second feedback information indicates that the network device is successfully accessed. Based on the second feedback information, the network device can learn that the first terminal has successfully accessed the network device, so that subsequently the network device can further allocate a resource to the first terminal and communicate with the first terminal.

The method 501 may further include an optional part 550 and an optional part 560.

Part 550: The second terminal sends a preamble (preamble) to the network device, and the network device receives the preamble. Optionally, the preamble is carried on a PRACH. Sending the preamble to the network device through the PRACH may also be understood as initiating random access.

Part 560: The network device sends third random access response information, and the second terminal receives the third random access response information, where the third random access response information indicates the second timing advance.

For example, the second terminal may select a to-be-sent preamble (which is identified as a preamble 3) from candidate preambles, determine a PRACH resource for sending the preamble 3, and send the preamble 3 to the network device by using the PRACH resource. It may be understood that the second terminal may determine the foregoing random access identifier (for example, an RA-RNTI) based on the determined PRACH resource for sending the preamble 3. For a method for determining the random access identifier, refer to descriptions in the method 401. Details are not described herein again.

After the network device receives the preamble, the part 560 may be performed. For example, after receiving the preamble, the network device may obtain the random access identifier (for example, the RA-RNTI), scramble control information (which may also be understood as a control channel carrying the control information) of the third random access response information by using the random access identifier, and send the control information of the third random access response information and the third random access response information to the second terminal.

Optionally, the method 501 further includes a part 570. Part 570: The second terminal sends first terminal identifier information to the network device, and the network device receives the first terminal identifier information, where the first terminal identifier information indicates an identifier of the first terminal. Optionally, the first terminal identifier information is carried on a PUSCH. After receiving the first terminal identifier information in the part 570 and learning that the first terminal requests access, the network device may include the identifier of the first terminal in the second contention resolution information in the part 520. When the first terminal receives the second contention resolution information and determines that the second contention resolution information includes the identifier of the first terminal, the first terminal may obtain the fourth temporary identifier (for example, the foregoing third C-RNTI) from the second contention resolution information, where the fourth temporary identifier corresponds to the identifier of the first terminal.

The foregoing method may be understood as that the second terminal serving as an agent terminal of the first terminal initiates an access request to the network device. When the first terminal is a terminal that is sensitive to energy consumption, according to the foregoing method, the terminal that is sensitive to energy consumption may not need to send a random access request to the network device. Therefore, a random access requirement of the terminal that is sensitive to energy consumption can be satisfied while energy consumption is reduced.

Figure 5C:
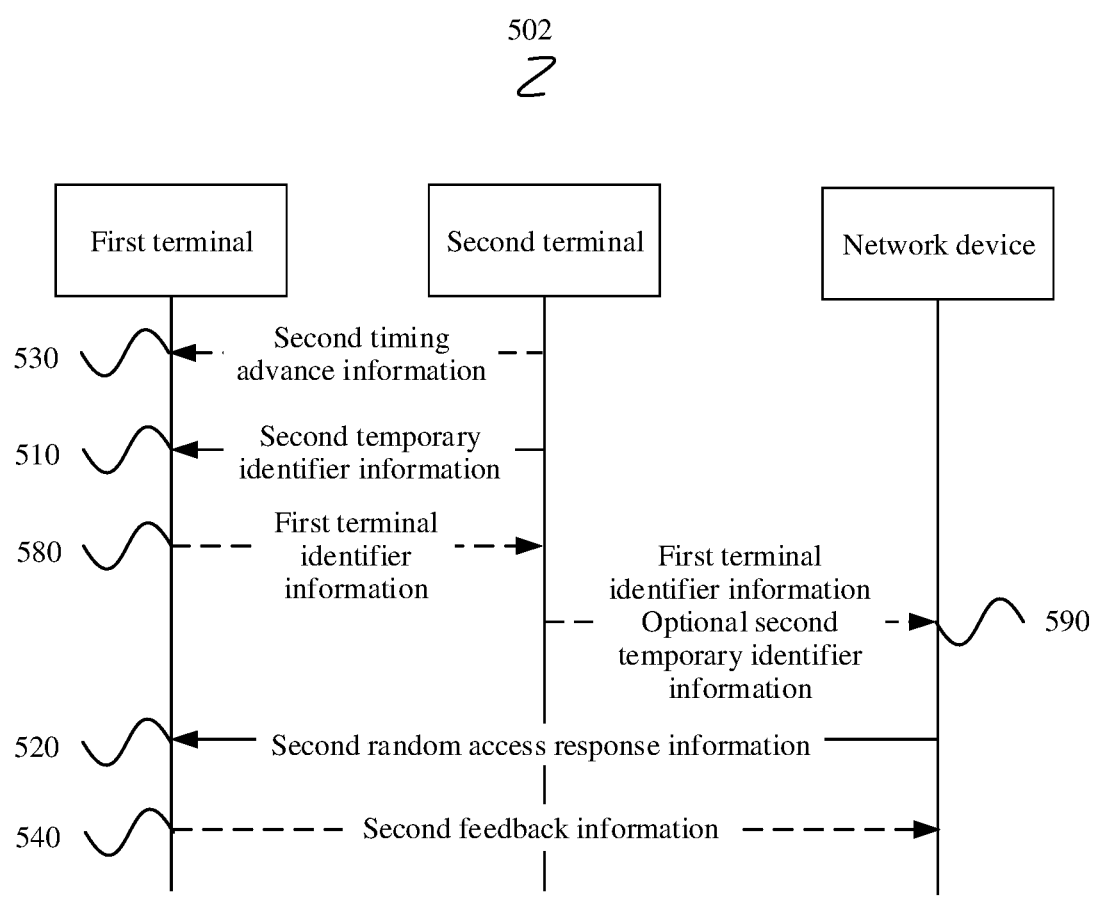

In another possible implementation method 502 of the method 500, with reference to FIG. 5C, the second temporary identifier information in the part 510 indicates a fifth temporary identifier, in the part 520, the network device sends second random access response information, and the first terminal obtains the second random access response information based on the fifth temporary identifier, where the second random access response information indicates a fourth temporary identifier. The second terminal in the method 502 may be understood as a second terminal in an RRC connected state. The method 502 further includes an optional part 530. Part 530:

The first terminal receives second timing advance information from the second terminal. Further, optionally, the first terminal communicates with the network device based on the fourth temporary identifier or the second timing advance information.

It may be understood that an execution sequence of the part 510 and the part 530 is not limited in this embodiment. The part 510 may be executed first and then the part 530 may be executed, the part 530 may be executed first and then the part 510 may be executed, or the part 510 and the part 530 may be simultaneously executed.

For example, the second timing advance information indicates a second timing advance, and the fifth temporary identifier is a sidelink RNTI (SL-RNTI). It may be understood that another name of the fifth temporary identifier is not limited. The second random access response information is carried on a PDSCH, and control information used to control the first terminal to receive the PDSCH is carried on a PDCCH. The first terminal descrambles the PDCCH by using the SL-RNTI, and receives, based on the control information (for example, either or both of resource allocation information and modulation and coding information) carried on the PDCCH, the PDSCH carrying the second random access response information. The fourth temporary identifier indicated by the second random access response information is a third C-RNTI.

The first terminal may communicate with the network device based on the third C-RNTI or the second timing advance. For example, the first terminal may descramble the PDCCH from the network device by using the third C-RNTI. For another example, the first terminal may determine, by using the second timing advance, a time point at which uplink data is sent to the network device.

In the part 530, optionally, the second timing advance information is carried on a sidelink channel. The sidelink channel may be a PSCCH, a PSSCH, or a PSDCH. The second terminal sends the second timing advance information to the first terminal through the sidelink channel. It may be understood that the second terminal may send the second timing advance information to the first terminal through the sidelink channel in a broadcast or multicast manner or may send the second timing advance information to the first terminal through the sidelink channel in a unicast manner.

In the part 530, optionally, the second timing advance information is carried on an SL BWP, a default BWP, an initial BWP, or a UL BWP.

The method 502 may further include an optional part 540. Part 540: The first terminal sends second feedback information to the network device, where the second feedback information indicates that the network device is successfully accessed. Based on the second feedback information, the network device can learn that the first terminal has successfully accessed the network device, so that subsequently the network device can further allocate a resource to the first terminal and communicate with the first terminal.

The method 502 may further include an optional part 590.

In a possible implementation of the part 590, the second terminal sends first terminal identifier information and the second temporary identifier information, and the network device receives the first terminal identifier information and the second temporary identifier information, where the first terminal identifier information indicates an identifier of the first terminal, and the second temporary identifier information indicates the fifth temporary identifier (for example, the foregoing SL-RNTI). The first terminal identifier information and the second temporary identifier information may be carried in one piece of signaling or may be respectively carried in two pieces of signaling.

In another possible implementation of the part 590, the second terminal sends first terminal identifier information, and the network device receives the first terminal identifier information, where the first terminal identifier information indicates an identifier of the first terminal. It may be understood that, in this implementation of the part 590, the fifth temporary identifier (for example, the foregoing SL-RNTI) is configured by the network device for the second terminal. When receiving the first terminal identifier information from the second terminal, the network device may learn of the fifth temporary identifier corresponding to the second terminal, and the second terminal does not need to send, to the network device, the second temporary identifier information indicating the fifth temporary identifier.

After the network device receives the first terminal identifier information and the second temporary identifier information, or after the network device receives the first terminal identifier information, the part 520 may be performed.

For example, after receiving the first terminal identifier information and the second temporary identifier information, or after receiving the first terminal identifier information, the network device may obtain the fifth temporary identifier (for example, the SL-RNTI) and the identifier of the first terminal, scramble control information (which may also be understood as a control channel carrying the control information) of the second random access response information by using the fifth temporary identifier, and send the control information of the second random access response information and the second random access response information to the first terminal. When the first terminal receives the second random access response information and determines that the second random access response information includes the identifier of the first terminal, the first terminal may obtain the fourth temporary identifier (for example, the foregoing third C-RNTI) from the second random access response information, where the fourth temporary identifier corresponds to the identifier of the first terminal.

The method 502 may further include an optional part 580 before the part 590. Part 580: The first terminal sends the first terminal identifier information, where the first terminal identifier information indicates the identifier of the first terminal. The second terminal receives the first terminal identifier information to obtain the identifier of the first terminal.

According to the foregoing method, the first terminal can initiate a random access request to a base station by using the second terminal in the RRC connected state. When the first terminal is a terminal that is sensitive to energy consumption, according to the foregoing method, the terminal that is sensitive to energy consumption may not need to send the random access request to the network device. Therefore, a random access requirement of the terminal that is sensitive to energy consumption can be satisfied while energy consumption is reduced. In addition, because the second terminal in the RRC connected state may assist the first terminal in initiating the random access request to the base station by using a contention-free resource or a low-contention resource, a contention probability in a random access process can be reduced, an access success rate can be improved, access time can be reduced, and energy consumption that is of the first terminal and that is generated in the random access process can be further reduced.

It may be understood that there may be one or more first terminals in the method 400, the method 401, the method 402, the method 500, the method 501, and the method 502. When there is a plurality of first terminals, the plurality of first terminals may jointly complete random access through terminal group building according to the method 400, the method 401, the method 402, the method 500, the method 501, or the method 502, to reduce a contention probability or a collision probability when a large quantity of terminals accesses a network.

Corresponding to the methods provided in the foregoing method embodiments, the embodiments further provide corresponding apparatuses. The apparatus includes a corresponding module configured to perform the foregoing embodiment. The module may be software, hardware, or a combination of software and hardware.

Figure 6:
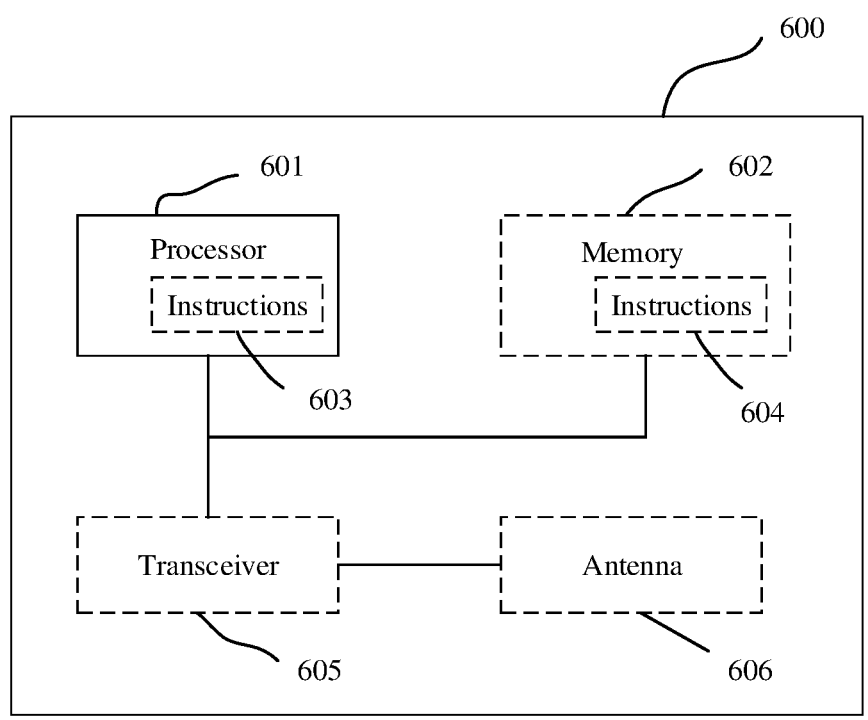
FIG. 6 is a schematic diagram of a structure of a communication apparatus according to an embodiment.

FIG. 6 is a schematic diagram of a structure of an apparatus. The apparatus 600 may be a network device; may be a terminal device; may be a chip, a chip system, a processor, or the like that supports a network device in implementing the foregoing methods; or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The apparatus 600 may include one or more processors 601. The processor 601 may also be referred to as a processing unit and may implement a control function. The processor 601 may be a general-purpose processor, a dedicated processor, or the like. For example, the processor 601 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional implementation, the processor 601 may also store instructions and/or data 603. The instructions and/or data 603 may be run by the processor, to enable the apparatus 600 to perform the methods described in the foregoing method embodiments.

In another optional implementation, the processor 601 may include a transceiver unit configured to implement receiving and sending functions. For example, the transceiver unit may be a transceiver circuit, an interface, or an interface circuit. A transceiver circuit, an interface, or an interface circuit configured to implement the sending function and a transceiver circuit, an interface, or an interface circuit configured to implement the receiving function may be separated or may be integrated together. The transceiver circuit, the interface, or the interface circuit may be configured to read and write code or data. Alternatively, the transceiver circuit, the interface, or the interface circuit may be configured to transmit or transfer a signal.

In still another possible implementation, the apparatus 600 may include a circuit. The circuit may implement the sending, receiving, or communication function in the foregoing method embodiments.

Optionally, the apparatus 600 may include one or more memories 602. The memory stores instructions 604, and the instructions may be run on the processor, to enable the apparatus 600 to perform the methods described in the foregoing method embodiments. Optionally, the memory may further store data. Optionally, the processor may also store instructions and/or data. The processor and the memory may be separately disposed or may be integrated together. For example, the correspondences described in the foregoing method embodiments may be stored in the memory or stored in the processor.

Optionally, the apparatus 600 may further include a transceiver 605 and/or an antenna 606. The processor 601 may be referred to as a processing unit and controls the apparatus 600. The transceiver 605 may be referred to as a transceiver unit, a transceiver circuit, a transceiver apparatus, a transceiver module, or the like, and is configured to implement a transceiver function.

Optionally, the apparatus 600 in this embodiment may be configured to perform the method described in FIG. 4A, FIG. 4B, FIG. 4C, FIG. 5A, FIG. 5B, or FIG. 5C in the embodiments, or may be configured to perform a method in which the methods described in the foregoing two or more figures are combined with each other.

The processor and the transceiver may be implemented in an integrated circuit (IC), an analog IC, a radio frequency integrated circuit RFIC, a mixed-signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be the network device or the terminal device. However, a range of the apparatus is not limited thereto, and the structure of the apparatus may not be limited to FIG. 6. The apparatus may be an independent device or may be a part of a larger device. For example, the apparatus may be:

(1) an independent integrated circuit IC, a chip, or a chip system or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like;
(6) others, or the like.

Figure 7:
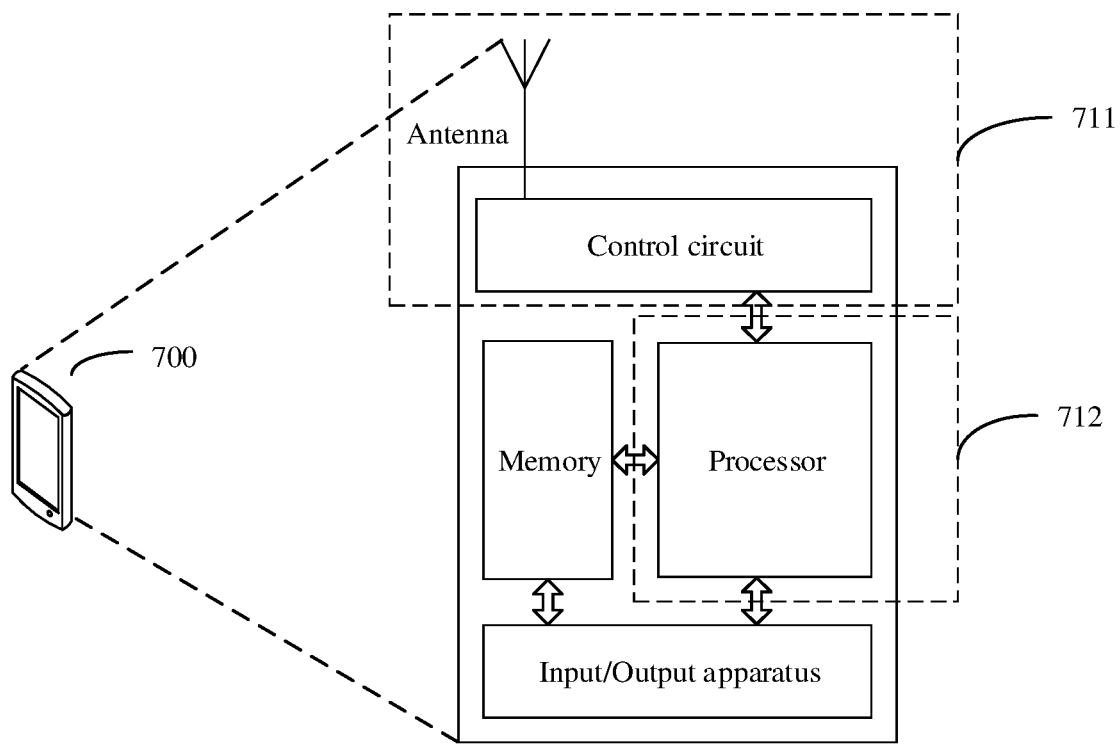
FIG. 7 is a schematic diagram of a structure of a terminal according to an embodiment.

FIG. 7 is a schematic diagram of a structure of a terminal device. The terminal device is applicable to the scenario shown in FIG. 1 or FIG. 3. For ease of description, FIG. 7 shows only main components of the terminal device. As shown in FIG. 7, the terminal device 700 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user and output data to the user.

After the terminal device is powered on, the processor may read the software program in a storage unit, parse and execute instructions of the software program, and process the data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends, by using the antenna, the radio frequency signal in an electromagnetic wave form. When data is sent to the terminal device, the radio frequency circuit receives a radio frequency signal by using the antenna, further converts the radio frequency signal into a baseband signal, and outputs the baseband signal to the processor. The processor converts the baseband signal into data and processes the data.

For ease of description, FIG. 7 shows only one memory and one processor. In an actual terminal device, there may be a plurality of processors and a plurality of memories. The memory may also be referred to as a storage medium, a storage device, or the like. This is not limited in the embodiments.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 7 integrates functions of the baseband processor and the central processing unit. A person skilled in the art may understand that the baseband processor and the central processing unit may be separate processors and are interconnected through a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor or may be stored in the storage unit in a form of a software program. The processor executes the software program to implement a baseband processing function.

In an example, the antenna and the control circuit that have receiving and sending functions may be considered as a transceiver unit 711 of the terminal device 700, and the processor having a processing function may be considered as a processing unit 712 of the terminal device 700. As shown in FIG. 7, the terminal device 700 includes the transceiver unit 711 and the processing unit 712. The transceiver unit may also be referred to as a transceiver apparatus, or the like. Optionally, a device that is in the transceiver unit 711 and that is configured to implement a receiving function may be considered as a receiving unit, and a device that is in the transceiver unit 711 and that is configured to implement a sending function may be considered as a sending unit. In other words, the transceiver unit 711 includes the receiving unit and the sending unit. For example, the receiving unit may also be referred to as a receiver, a receiver circuit, or the like, and the sending unit may be referred to as a transmitter, a transmitter circuit, or the like. Optionally, the receiving unit and the sending unit may be one integrated unit or may be a plurality of independent units. The receiving unit and the sending unit may be in one geographical location or may be distributed in a plurality of geographical locations.

Figure 8:
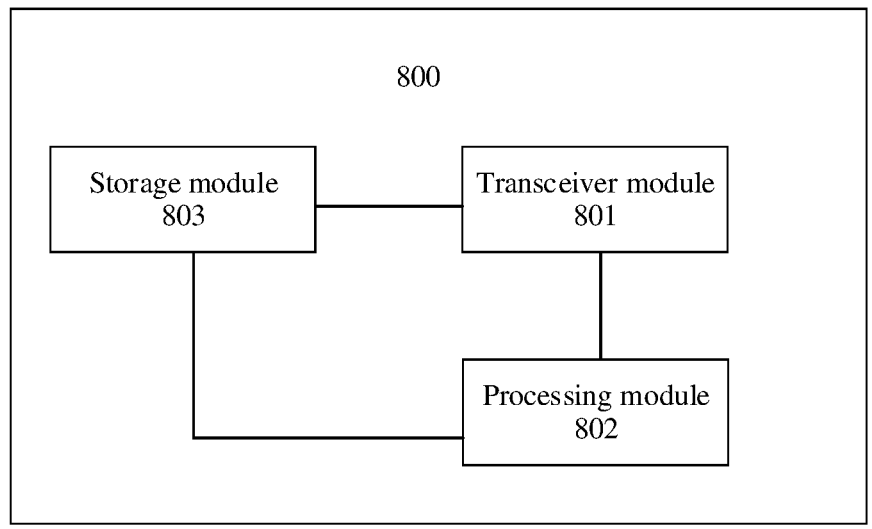
FIG. 8 is a schematic diagram of another communication apparatus according to an embodiment.

As shown in FIG. 8, another embodiment provides an apparatus 800. The apparatus 800 may be a terminal, or may be a component (for example, an integrated circuit or a chip)

of the terminal. Alternatively, the apparatus 800 may be a network device, or may be a component (for example, an integrated circuit or a chip) of the network device. Alternatively, the apparatus 800 may be another communication module configured to implement the methods in the method embodiments. The apparatus 800 may include a processing module 802 (or referred to as a processing unit). Optionally, the apparatus 800 may further include a transceiver module 801 (or referred to as a transceiver unit) and a storage module 803 (or referred to as a storage unit).

In a possible implementation, one or more modules in FIG. 8 may be implemented by one or more processors, may be implemented by one or more processors and memories, may be implemented by one or more processors and transceivers, or may be implemented by one or more processors, memories, and transceivers. This is not limited in the embodiments. The processor, the memory, and the transceiver may be disposed separately, or may be integrated.

The apparatus 800 may implement a function of the terminal described in the embodiments. For example, the apparatus 800 includes a corresponding module, unit, or means (means) used for the terminal to perform the steps related to the terminal that are described in the embodiments. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments. Alternatively, the apparatus 800 may implement a function of the network device described in the embodiments. For example, the apparatus 800 includes a corresponding module, unit, or means used for the network device to perform the steps related to the network device that are described in the embodiments. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 800 in this embodiment may be configured to perform the method described in FIG. 4A, FIG. 4B, FIG. 4C, FIG. 5A, FIG. 5B, or FIG. 5C in the embodiments, or may be configured to perform a method in which the methods described in the foregoing two or more figures are combined with each other.

In a possible implementation, the apparatus 800 may include the processing module 802 and the transceiver module 801. The transceiver module 801 receives preamble identifier information and random access identifier information from a second terminal, and the processing module 802 controls, based on the preamble identifier information and the random access identifier information, the transceiver module 801 to receive first random access response information from the network device.

Optionally, the first random access response information includes first temporary identifier information and first timing advance information.

Optionally, the preamble identifier information indicates a preamble identifier, and the random access identifier information indicates a random access identifier. The random access identifier may be, for example, an RA-RNTI.

Optionally, the transceiver module 801 sends first feedback information to the network device, where the first feedback information indicates that the network device is successfully accessed. Based on the first feedback information, the network device can learn that the apparatus 800 or a first terminal corresponding to the apparatus 800 has successfully accessed the network device, so that subsequently the network device can further allocate a resource to the apparatus 800 and communicate with the apparatus 800.

Optionally, the preamble identifier information and the random access identifier information are carried on a sidelink channel. The sidelink channel may be, for example, a PSCCH, a PSSCH, or a PSDCH.

Optionally, the preamble identifier information and the random access identifier information are carried on one of the following BWPs: a sidelink BWP (SL BWP), a default BWP, which is sometimes referred to as a fallback BWP, an initial BWP, or an uplink BWP (UL BWP).

Optionally, the apparatus 800 (or the first terminal corresponding to the apparatus 800) and the second terminal belong to a same terminal group.

Optionally, the apparatus 800 (or the first terminal corresponding to the apparatus 800) is a terminal that is sensitive to energy consumption, and the second terminal is a terminal that is insensitive to energy consumption.

By using the foregoing apparatus, the apparatus 800 or the first terminal corresponding to the apparatus 800 receives random access response information based on related information from the second terminal. The apparatus 800 or the first terminal corresponding to the apparatus 800 may not need to send a random access request to the network device. Therefore, a random access requirement of the apparatus 800 or the first terminal corresponding to the apparatus 800 can be satisfied while energy consumption is reduced.

In some possible implementations of the apparatus 800, the first temporary identifier information indicates a first temporary identifier. The processing module 802 controls, based on the first temporary identifier, the transceiver module 801 to receive first contention resolution information from the network device, where the first contention resolution information indicates a second temporary identifier.

Optionally, the first contention resolution information is carried on a PDSCH.

Optionally, the processing module 802 controls, based on the second temporary identifier or the first timing advance information, the transceiver module 801 to communicate with the network device.

Optionally, the first temporary identifier is a first TC-RNTI, the first timing advance information indicates a first timing advance, and the second temporary identifier is a first C-RNTI.

According to the foregoing implementation of the apparatus 800, the apparatus 800 or the first terminal corresponding to the apparatus 800 may not need to send the random access request to the network device. Therefore, the random access requirement of the apparatus 800 or the first terminal corresponding to the apparatus 800 can be satisfied while the energy consumption is reduced.

In some possible implementations of the apparatus 800, the first temporary identifier information indicates a second temporary identifier.

Optionally, the processing module 802 controls, based on the second temporary identifier or the first timing advance information, the transceiver module 801 to communicate with the network device.

Optionally, the second temporary identifier is a second C-RNTI, and the first timing advance information indicates a second timing advance.

According to the foregoing implementation of the apparatus 800, the apparatus 800 or the first terminal corresponding to the apparatus 800 may not need to send the random access request to the network device. Therefore, the random access requirement of the apparatus 800 or the first terminal corresponding to the apparatus 800 can be satisfied while the energy consumption is reduced, and an access process is simplified, to reduce an access delay and signaling overheads.

In another possible implementation, the apparatus 800 may include the processing module 802 and the transceiver module 801. The transceiver module 801 receives second temporary identifier information from a second terminal, and the processing module 802 controls, based on the second temporary identifier information, the transceiver module 801 to receive second random access response information or second contention resolution information from the network device.

Optionally, the second temporary identifier information is carried on a sidelink channel. The sidelink channel may be, for example, a PSCCH, a PSSCH, or a PSDCH.

Optionally, the second temporary identifier information is carried on one of the following BWPs: a sidelink BWP (SL BWP), a default BWP, which is sometimes referred to as a fallback BWP, an initial BWP, or an uplink BWP (UL BWP).

Optionally, the transceiver module 801 sends second feedback information to the network device, where the second feedback information indicates that the network device is successfully accessed. Based on the second feedback information, the network device can learn that the apparatus 800 or a first terminal corresponding to the apparatus 800 has successfully accessed the network device, so that subsequently the network device can further allocate a resource to the apparatus 800 or the first terminal corresponding to the apparatus 800 and communicate with the apparatus 800 or the first terminal corresponding to the apparatus 800.

Optionally, the apparatus 800 (or the first terminal corresponding to the apparatus 800) and the second terminal belong to a same terminal group.

Optionally, the apparatus 800 (or the first terminal corresponding to the apparatus 800) is a terminal that is sensitive to energy consumption, and the second terminal is a terminal that is insensitive to energy consumption.

By using the foregoing apparatus, the apparatus 800 or the first terminal corresponding to the apparatus 800 receives random access response information or contention resolution information based on related information from the second terminal. The apparatus 800 or the first terminal corresponding to the apparatus 800 may not need to send a random access request to the network device. Therefore, a random access requirement of the apparatus 800 or the first terminal corresponding to the apparatus 800 can be satisfied while energy consumption is reduced.

In some possible implementations of the apparatus 800, the second temporary identifier information indicates a third temporary identifier. The processing module 802 controls, based on the third temporary identifier, the transceiver module 801 to receive the second contention resolution information from the network device, where the second contention resolution information indicates a fourth temporary identifier.

Optionally, the transceiver module 801 receives second timing advance information from the second terminal, where the second timing advance information indicates a second timing advance. The second timing advance information may be carried on the sidelink channel, and the sidelink channel may be, for example, a PSCCH, a PSSCH, or a PSDCH. The second timing advance information may be carried on the SL BWP, the default BWP, the initial BWP, or the UL BWP. The third temporary identifier is a second TC-RNTI, the second contention resolution information is carried on a PDSCH, and the fourth temporary identifier is a third C-RNTI. Further, optionally, the processing module 802 controls, based on the fourth temporary identifier or the second timing advance information, the transceiver module 801 to communicate with the network device.

According to the foregoing implementation, the apparatus 800 or the first terminal corresponding to the apparatus 800 may not need to send the random access request to the network device. Therefore, the random access requirement of the apparatus 800 or the first terminal corresponding to the apparatus 800 can be satisfied while the energy consumption is reduced.

In some possible implementations of the apparatus 800, the second temporary identifier information indicates a fifth temporary identifier. The processing module 802 controls, based on the fifth temporary identifier, the transceiver module 801 to receive the second random access response information from the network device, where the second random access response information indicates a fourth temporary identifier.

Optionally, the transceiver module 801 receives second timing advance information from the second terminal, where the second timing advance information indicates a second timing advance. The second timing advance information may be carried on the sidelink channel, and the sidelink channel may be, for example, a PSCCH, a PSSCH, or a PSDCH. The second timing advance information may be carried on the SL BWP, the default BWP, the initial BWP, or the UL BWP. The fifth temporary identifier is a sidelink RNTI (SL-RNTI), the second random access response information is carried on a PDSCH, and the fourth temporary identifier is a third C-RNTI. Further, optionally, the processing module 802 controls, based on the fourth temporary identifier or the second timing advance information, the transceiver module 801 to communicate with the network device.

Optionally, the transceiver module 801 sends first terminal identifier information to the second terminal, where the first terminal identifier information indicates an identifier of the first terminal.

According to the foregoing implementation, the apparatus 800 or the first terminal corresponding to the apparatus 800 may not need to send the random access request to the network device. Therefore, the random access requirement of the apparatus 800 or the first terminal corresponding to the apparatus 800 can be satisfied while the energy consumption is reduced.

It may be understood that, in some scenarios, some optional features in the embodiments may be independently implemented without depending on another feature, for example, a solution on which the optional features are currently based, to resolve a corresponding problem and achieve a corresponding effect. Alternatively, in some scenarios, the optional features are combined with other features based on requirements. Correspondingly, the apparatus provided in the embodiments may also correspondingly implement these features or functions. Details are not described herein.

A person skilled in the art may further understand that various illustrative logical blocks and steps that are listed in the embodiments may be implemented by using electronic hardware, computer software, or a combination thereof. Whether the functions are implemented by using hardware or software depends on particular applications and a design requirement of the entire system. A person skilled in the art may use various methods to implement the described functions for corresponding application, but it should not be considered that the implementation goes beyond the scope of the embodiments.

It may be understood that the processor in the embodiments may be an integrated circuit chip and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component.

The solutions may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in the embodiments may be a transitory memory or a non-transitory memory or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM) and is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described is intended to include, but not limited to, these memories and any memory of another proper type.

A non-transitory computer-readable medium may store a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It may be understood that "an embodiment" means that particular features, structures, or characteristics related to the embodiment are included in at least one embodiment. Therefore, the embodiments are not necessarily same embodiments. In addition, these particular features, structures, or characteristics may be combined in one or more embodiments in any appropriate manner. It may be understood that sequence numbers of the foregoing processes do not mean an execution sequence in various embodiments. The execution sequence of the processes should be determined based on functions and internal logic of the processes and should not be construed as any limitation on the implementation processes of the embodiments.

It may be understood that "when" and "if" mean that an apparatus performs corresponding processing in an objective situation, but do not constitute a limitation on time, do not require that the apparatus have a determining action during implementation, and do not mean any other limitation.

"Simultaneously" may be understood as being at a same time point, may be understood as being within a time period, or may be understood as being within a same periodicity.

A person skilled in the art may understand that first, second, and various reference numerals are for distinguishing only for ease of description and are not used to limit the scope of the embodiments. A value of a numeral (which may also be referred to as an index), a value of a quantity, and a location are merely used as an example, but are not unique representation forms, and are not used to limit the scope of the embodiments. First, second, and various reference numerals are for distinguishing only for ease of description and are not used to limit the scope of the embodiments.

Unless otherwise specified, an element represented in a singular form is intended to represent "one or more" but is not intended to represent "one and only one". Unless otherwise specified, "at least one" is intended to represent "one or more", and "multiple" is intended to represent "two or more".

In addition, the terms "system" and "network" are usually used interchangeably. The term "and/or" in this specification describes only an association relationship for describing associated objects and represents those three relationships may exist. For example, A and/or B may represent the following three cases: only A exists, both A and B exist, and only B exists. A may be singular or plural, and B may be singular or plural. The character "/" usually indicates an "or" relationship between associated objects.

The term "at least one of" indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It may be understood that in the embodiments, "B corresponding to A" indicates that B is associated with A, and B may be determined based on A. However, it should be further understood that determining B based on A does not mean that B is determined based only on A. B may also be alternatively determined based on A and/or other information.

The correspondences shown in the tables may be configured or may be predefined. Values of the information in the tables are merely examples, and other values may be configured. This is not limited. When a correspondence between information and each parameter is configured, not all correspondences shown in the tables need to be configured. For example, in the tables, correspondences shown in some rows may alternatively not be configured. For another example, proper deformations and adjustments, such as splitting and combination, may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" may be understood as "define", "predefine", "store", "pre-store", "pre-negotiate", "pre-configure", "solidify", or "pre-burn".

A person of ordinary skill in the art may understand that units and algorithm steps in the examples described with reference to the embodiments can be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope.

A person of ordinary skill in the art may understand that, for ease and brevity of description, for a detailed working process of the foregoing system, apparatus, and units, refer to a corresponding process in the foregoing method embodiments. Details are not described herein again.

It may be understood that the system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the solutions essentially, or the part contributing to the prior art, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

For same or similar parts in the embodiments, refer to each other. In the embodiments and the implementations/implementation methods/implementation methods in the embodiments, unless otherwise specified or a logical conflict occurs, terms and/or descriptions are consistent and may be mutually referenced between different embodiments and between the implementations/implementation methods/implementation methods in the embodiments. Features in the different embodiments and the implementations/implementation methods/implementation methods in the embodiments may be combined to form a new embodiment, implementation, implementation method, or implementation method according to an internal logical relationship thereof. The foregoing descriptions are implementations, but are not intended to limit the protection scope.

The foregoing descriptions are merely implementations, but the protection scope is not limited thereto. Any variation or replacement readily figured out by a person skilled in the art shall fall within the protection scope.

What is claimed is:

1. A communication method comprising:
    receiving preamble identifier information and random access identifier information from a second terminal; and
    receiving first random access response information from a network device based on the preamble identifier information and the random access identifier information;
    wherein the preamble identifier information and the random access identifier information are carried on a sidelink channel.

2. The communication method according to claim 1, wherein the first random access response information comprises first temporary identifier information and first timing advance information.

3. The communication method according to claim 2, wherein the first temporary identifier information indicates a first temporary identifier; and the method further comprises:
receiving first contention resolution information from the network device based on the first temporary identifier, wherein the first contention resolution information indicates a second temporary identifier.

4. The communication method according to claim 2, wherein the first temporary identifier information indicates a second temporary identifier.

5. The communication method according to claim 3, wherein the method further comprises:
communicating with the network device based on the second temporary identifier or the first timing advance information.

6. The communication method according to claim 1, wherein the method further comprises:
sending first feedback information to the network device, wherein the first feedback information indicates that the network device is successfully accessed.

7. A communication apparatus, comprising:
one or more processors; and
a memory coupled to the one or more processors, wherein the memory stores a program to be executed by the one or more processors, and wherein the program, when executed by the one or more processors, instructs the one or more processors to perform operations comprising:
receiving preamble identifier information and random access identifier information from a second terminal; and
receiving first random access response information from a network device based on the preamble identifier information and the random access identifier information;
wherein the preamble identifier information and the random access identifier information are carried on a sidelink channel.

8. The communication apparatus according to claim 7, wherein the first random access response information comprises first temporary identifier information and first timing advance information.

9. The communication apparatus according to claim 8, wherein the first temporary identifier information indicates a first temporary identifier; and
wherein the operations further comprise:
receiving first contention resolution information from the network device based on the first temporary identifier, wherein the first contention resolution information indicates a second temporary identifier.

10. The communication apparatus according to claim 8, wherein the first temporary identifier information indicates a second temporary identifier.

11. The communication apparatus according to claim 9, wherein the operations further comprise: communicating with the network device based on the second temporary identifier or the first timing advance information.

12. The communication apparatus according to claim 7, wherein the operations further comprise:
sending first feedback information to the network device, wherein the first feedback information indicates that the network device is successfully accessed.

13. A non-transitory computer readable medium storing instructions that, when executed by one or more processors, instructs the one or more processors to perform operations comprising:
receiving preamble identifier information and random access identifier information from a second terminal; and
receiving first random access response information from a network device based on the preamble identifier information and the random access identifier information;
wherein the preamble identifier information and the random access identifier information are carried on a sidelink channel.

14. The non-transitory computer readable medium according to claim 13, wherein the first random access response information comprises first temporary identifier information and first timing advance information.

15. The non-transitory computer readable medium according to claim 14, wherein the first temporary identifier information indicates a first temporary identifier; and
wherein the operations further comprise:
receiving first contention resolution information from the network device based on the first temporary identifier, wherein the first contention resolution information indicates a second temporary identifier.

16. The non-transitory computer readable medium according to claim 14, wherein the first temporary identifier information indicates a second temporary identifier.

17. The non-transitory computer readable medium according to claim 15, wherein the operations further comprise: communicating with the network device based on the second temporary identifier or the first timing advance information.

18. The non-transitory computer readable medium according to claim 13, wherein the operations further comprise: sending first feedback information to the network device, wherein the first feedback information indicates that the network device is successfully accessed.

* * * * *